US00RE38637E1

(19) United States
(12) Reissued Patent
Willard

(10) Patent Number: US RE38,637 E
(45) Date of Reissued Patent: Oct. 26, 2004

(54) DATA COLLECTION SYSTEM

(75) Inventor: Jim Paul Willard, Olney, MD (US)

(73) Assignee: iPaper, LLC, Richmond, VA (US)

(21) Appl. No.: 09/590,070

(22) Filed: Jun. 9, 2000

(Under 37 CFR 1.47)

Related U.S. Patent Documents

Reissue of:
(64) Patent No.: 5,764,221
Issued: Jun. 9, 1998
Appl. No.: 08/619,457
Filed: Mar. 19, 1996

(51) Int. Cl.[7] ..... G06G 5/00; G06F 17/60
(52) U.S. Cl. ..... 345/173; 345/169; 235/386
(58) Field of Search ..... 345/173, 179, 345/157, 85, 175, 169; 178/18; 235/375, 380, 384, 386

(56) References Cited

U.S. PATENT DOCUMENTS 4,377,870 A * 3/1983 Anderson et al.
4,851,654 A * 7/1989 Nitta ..... 235/492
4,912,640 A * 3/1990 Tsugei ..... 700/90
4,916,441 A * 4/1990 Gombrich
5,049,862 A * 9/1991 Dao et al.
5,243,149 A * 9/1993 Comerford et al.
5,278,673 A * 1/1994 Scapa et al. ..... 358/473
5,313,051 A * 5/1994 Brigida et al.
5,351,186 A * 9/1994 Bullock et al. ..... 705/1
5,497,464 A * 3/1996 Yeh ..... 710/303
5,543,589 A * 8/1996 Buchana et al.
5,560,021 A * 9/1996 Vook et al.
5,587,560 A * 12/1996 Crooks et al. ..... 178/18.03
5,630,168 A * 5/1997 Rosebrugh et al. ..... 710/5
5,666,495 A * 9/1997 Yeh ..... 710/303
5,744,789 A * 4/1998 Kashi ..... 235/462.45
5,796,351 A * 8/1998 Yabuki ..... 340/825.69
5,808,903 A * 9/1998 Schiltz et al. ..... 702/56
5,838,302 A * 11/1998 Kuriyama et al. ..... 345/173
5,999,908 A * 12/1999 Abelow ..... 705/1
6,462,733 B1 * 10/2002 Murakami ..... 345/173

* cited by examiner

*Primary Examiner*—Steven Saras
*Assistant Examiner*—Alecia D. Nelson
(74) *Attorney, Agent, or Firm*—Jacobson Holman PLLC

(57) ABSTRACT

An electronic data collection device configured in a substantially two-dimensional arrangement is disclosed. The data collection device uses inexpensive flexible sheet materials to provide a flat framework in which to situate an interconnected combination of electronic components. The components provide an interactive function to supply input-output, control, and power functions. Components can include an information display, switches for responding to questions displayed on the information display, memory for storing responses to the questions, and a controller for controlling the operation of the data collection device. In addition, the device is provided with a data transfer interface that permits stored responses to be gathered by a response data accumulation device, such as a computer, having a corresponding interface.

42 Claims, 18 Drawing Sheets

Please write name, one letter per box, and fill in the corresponding letter oval

DATA COLLECTION SYSTEM

Matter enclosed in heavy brackets [ ] appears in the original patent but forms no part of this reissue specification; matter printed in italics indicates the additions made by reissue.

BACKGROUND

The present invention relates to a system for collecting data, and in particular to a low cost electronic data collection device.

Data collection processing has experienced numerous advances in the areas of equipment, software, and processes. However, the medium used to collect data has seen little or no improvement. The collection medium of choice remains paper. Accordingly, most if not all data collected in the form of applications, tax returns, surveys, ballots, tests, and the like, begins with filling out paper forms. Subsequent processing to collect the data off of the paper is manually intensive, error prone, time consuming, and costly.

Consider the simplest data collection process wherein a collection instrument comprising one or more sheets of paper, or a booklet, contains questions that a respondent is invited to answer. There may be an answer space next to each question wherein the respondent is to write in their response. After completion, the forms are collected and are manually inspected to collect response data. If the data is to be compiled, a data entry clerk or operator may be enlisted to transcribe the data into a log or computer database.

Such a system is very cumbersome due, in part, to the labor intensive nature of manually transcribing data from responses into a collective log or database. Indeed, a large cost component associated with conventional data collection processes of this sort, is the expense of labor dedicated to transcribing the data. In addition, manual transcription is susceptible to errors because of transcriber fatigue, misinterpretation, and human error. Turn around time also is slow because of the delays involved by manual transcription. The solution proposed, and now widely adopted, is to reduce the collection medium (e.g., the answer portion of the survey) to a machine readable form.

A machine readable collection medium involves reducing answers on a form to a selection of, for example, small ovals, wherein each oval corresponds to an answer choice. The collection medium can consist of one or more sheets wherein questions and answers are arranged next to one another. Alternatively, the collection medium can be in the form of a separate answer sheet. In either case an answer choice is indicated by filling in, or even punching out (if answer form is a punch card), a defined space corresponding to an answer choice. The answer form(s) is collected and fed into a scanning device that interprets answer indications.

A simple answer scanning system may involve a specially designed optical scanner that interprets machine readable forms by sensing which answer selection has been filled-in. The scanner may operate in combination with a computer having a software program that operates the scanner to and gathers information sensed by the scanner. The information gathered by the system is then formatted and reported as desired.

A problem remains, however, in that optical scanner systems have been known to mis-read poorly entered answers (e.g., the answer space not sufficiently blackened in). This impacts not only the accuracy of the collected data, but also the costs of completing data collection. The system must be required to identify mis-marked forms. These forms are then collected and visually inspected by operators who manually enter the answers, or fill in the respondent's intended answer(s) and re-scan re-marked form. However, as with completely manual data gathering and collection, this too requires expensive and time-consuming manual intervention to complete the data collection process.

Another problem with machine readable media is the difficulty involved in collecting handwritten text. Handwritten text can be collected and inspected in a machine readable media system in several ways. One way is to solicit a respondent to translate the handwritten text into a machine readable form by filling in a corresponding of oval for each letter (i.e., A through Z) from among a group of ovals that are respectively arranged below contiguous letter boxes in a handwritten entry portion of the answer form (e.g., see FIG. 1). Another technique involves using a scanner in combination with a character recognition algorithm to interpret handwriting appearing in the contiguous boxes, or in an answer space. Both of these solutions, however, remain susceptible to machine reading errors. Consequently, visual review and manual entry are still required to complete data collection.

Systems, such as the aforementioned character recognition algorithms and optical imaging systems, designed for commercial scale operation are generally very expensive. Such systems can be utilized in data collection scenarios to process forms where a question may solicit a lengthy, handwritten, answer requiring a subjective response, or wherein a "Comments" section is provided. The costs of such systems is great because they typically involve complex combinations of paper sorting/routing machines and automatic scanners that operate in concert with sophisticated software programs running on customized computer platforms. A company or institution considering the purchase of a data collection system with any level of sophistication must contend with the fact that procurement of such a system involves a significant up-front investment. If the equipment is only used on an occasional basis, e.g., to perform an annual survey or to scan voting ballots, it represents non-performing idle capital equipment. Even with these systems, however, there remains the aforementioned accuracy problems that require manual intervention to overcome. Another problem with machine readable form systems is that the automated mechanisms designed to fold and stuff envelopes, open and unfold returned responses, and route and scan responses are prone to jamming.

One solution that moves away from paper forms is to enlist an electronic notepad that has a manually interactive display designed in accordance with data collection needs (e.g., inpatient medical chart notebook computer). Such systems, however, are merely special purpose notebook computers that remain relatively expensive. Furthermore, operation of such a data collection device usually requires training. In addition, such a device cannot be readily handed out in the manner that a test form, application form, survey, or the like, can be. Additionally, such a device cannot be easily mailed or folded.

What is needed is a data collection system that overcomes the foregoing disadvantages.

SUMMARY

The present invention overcomes the foregoing disadvantages by providing an electronic data collection device that completely replaces conventional paper forms in the data collection process. An electronic data collection device in accordance with exemplary embodiments of the invention is a combination of inexpensive, commercially available electronic components configured into a simple, substantially two-dimensional arrangement. The arrangement of components is fixed within one or more sheets of suitably thin, but durable material, such as paper or plastic. Such an arrangement is preferably rendered in form that is light and durable so that it can be folded, if necessary, so that it can be sent and returned via regular mail or by courier.

The arrangement, in an exemplary embodiment, includes a combination of electronic components comprising: input means, such as membrane switches, (e.g., corresponding to alphanumeric characters and/or function switches), for receiving user input responses; output means, such as a low profile LCD or LED information display; memory means, such as a simple memory device for storing system instructions, questions, and responses; logic means, such as a simple 8-bit CPU for controlling memory writes and retrieves, controlling the LCD, and receiving user responses; data transfer means, such as a simple radio frequency (RF) means, for transferring collected responses; and power means, such as a low profile battery, or solar cell, for providing power. The components are interconnected by a connection means, such as conductive ink, and appropriately affixed to a backing sheet using conductive, or non-conductive adhesive, as necessary. A cover sheet can include printed indications that overlay switches, and windows through which the information display and a solar cell (if used) appear.

The foregoing elements can be integrated into a low cost, light weight data collection device that completely replaces paper forms as a collection medium. Because the device can be intended for a single/limited use, and/or disposable operation, low cost componentry and inexpensive design elements can be selected.

Questions and information (e.g., instructions) can be displayed in the information display. The topology, or functional/visual appearance, of a device can be specifically tailored to the requirements of the particular data collection task that the data collection device is intended for (e.g., an electronic mail-in ballot). Alternatively, the data collection device can be supplied in a generic, or general embodiment, whereby all of the information and questions to be conveyed to a respondent appear on the information display.

Operation of a data collection device can involve displaying questions in the information display. A respondent can answer the questions using an alphanumeric array of switches, or by actuating one or more switches which can be arranged next to answer choices displayed by the information display. The answers entered by a respondent are stored in the memory. After the data collection device is returned, answers can be harvested, or "captured" within an external system. In accordance with one embodiment of the invention, this can be done by positioning the data collection device within the proximity of an external RF transceiver unit, connected to a personal computer, that is designed to capture recorded information from the data collection device. Automatic transfer of the information can take place in response to an encoded message from the RF transceiver unit. Such an arrangement allows substantially all processes associated with manual entry of collected data to be eliminated.

An electronic data collection device incorporating the invention reduces the costs and time associated with the data collection process. While individual data collection device unit costs may be greater than the costs of paper question forms and/or answer sheets, the labor cost involved with handling such materials, as well as the investment in optical reading systems, are substantially eliminated. Cost reductions in the data gathering process also are achieved by having a data originator, or respondent, directly input their responses into the data collection device in electronic form. Therefore, all of the processes and steps involved required to convert pencil entered data on forms are eliminated. Interpretation of respondent data is not required as would be the case with manual data entry, scanning or other automated image conversion processes. Consequently, the equipment required to perform such tasks is substantially eliminated. Data quality and process improvements are realized because there is no manual entry or interpretation required subsequent to data entry by a respondent.

BRIEF DESCRIPTION OF THE DRAWINGS

The foregoing, and other objects, features and advantages of the present invention will be more readily understood upon reading the following detailed description in conjunction with the drawings in which.

DETAILED DESCRIPTION

Figure 2A:
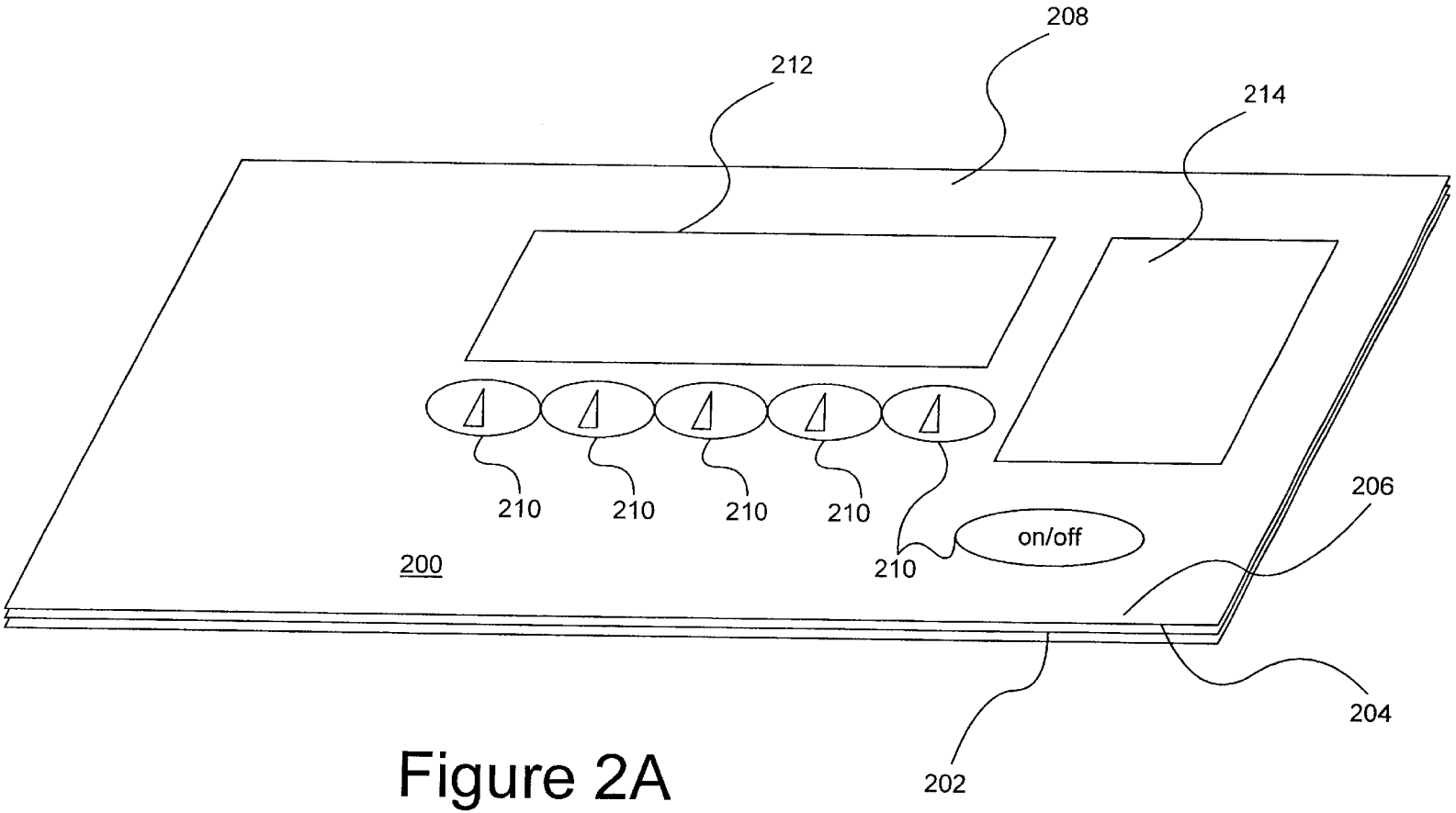
FIG. 2A depicts an exemplary embodiment of the invention.

An exemplary embodiment of a data collection device in accordance with the invention is shown in FIG. 2A. FIGS.

2B through 2H illustrate the front and back sides of the individual layers that comprise the exemplary embodiment depicted in FIG. 2A. The collection device 200, in the embodiment depicted in FIG. 2A, is comprised of three layers: a top layer 206 (see also FIGS. 2B and 2C), a middle layer 204 (see also FIGS. 2D and 2E), and a backing layer 202 (FIGS. 2F and 2G).

Figure 2B:
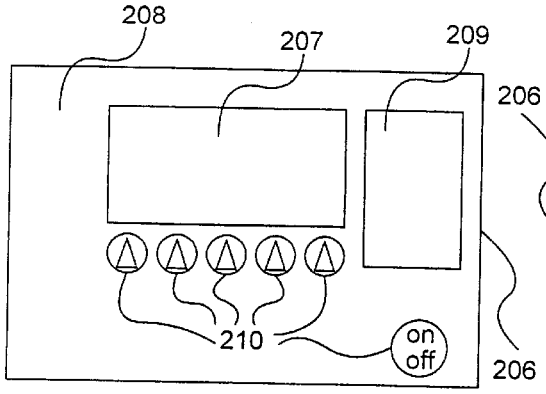
FIGS. 2B through 2G depict the sheet layers that comprise the exemplary embodiment of FIG. 2A.
Figure 2C:
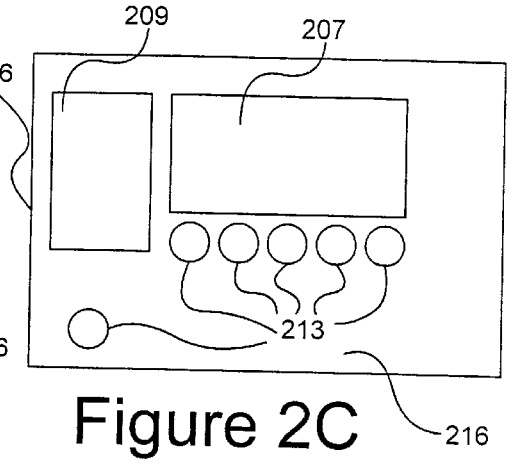
Figure 2D:
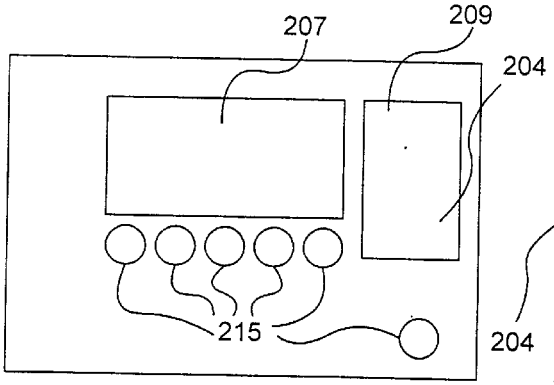
Figure 2E:
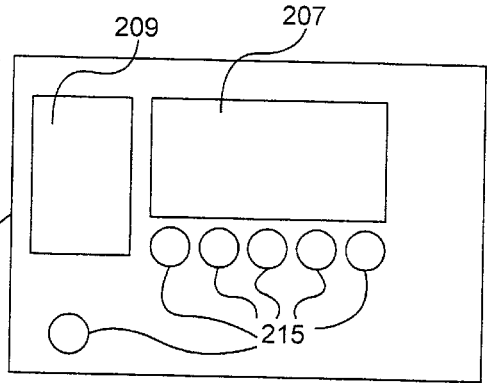
Figure 2F:
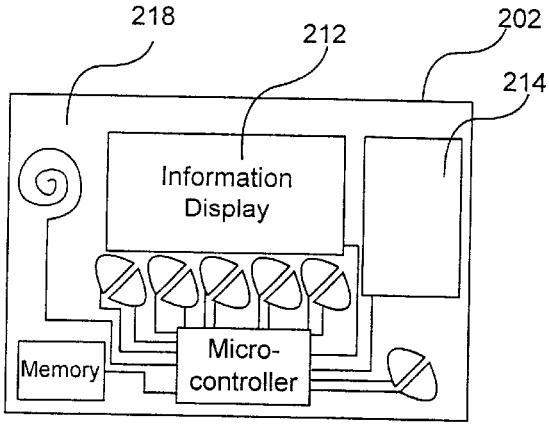
Figure 2G:
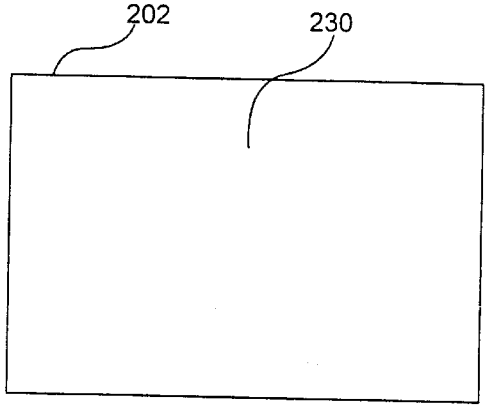

The front surface 208, or topology of the top layer 206 is depicted in FIG. 2B. The topology can be designed in accordance with the needs of the particular data collection task. The front surface 208 of the top layer 206 may comprise a variety of switches 210, and openings 207 and 209. Openings 207 and 209 receive an information display 212, and a power source, such as a solar cell 214, respectively. The inward facing, or back surface 216 of the top layer 206 is depicted in FIG. 2C. The back surface 216 has conductive points 213 printed thereon that correspond to the switches 210.

The middle layer 204 (FIGS. 2D and 2E), in the depicted embodiment, primarily serve to separate the conductive points 213 (on the back surface 216) corresponding to the switches 210, from contact points 220 (see FIG. 2H) on the inward facing, or top surface 218 of the backing layer 202. That is, the middle layer performs the task of isolating and insulating component elements on the back surface 216 of the top layer 206 and component elements affixed to the top surface 218 of the backing layer 202. This is achieved by defining apertures 215 in the middle layer 204 that are positioned between the contact points 220 of the backing layer 202 and the conductive points 213 on the back surface 216 of the top layer 206. Respective points can be brought into contact through an aperture when a respondent depresses a switch 210 thereby indicating a switching condition. The middle layer 204, also contains apertures through which the information display 212 and the solar cell 214 are received, respectively.

Figure 2H:
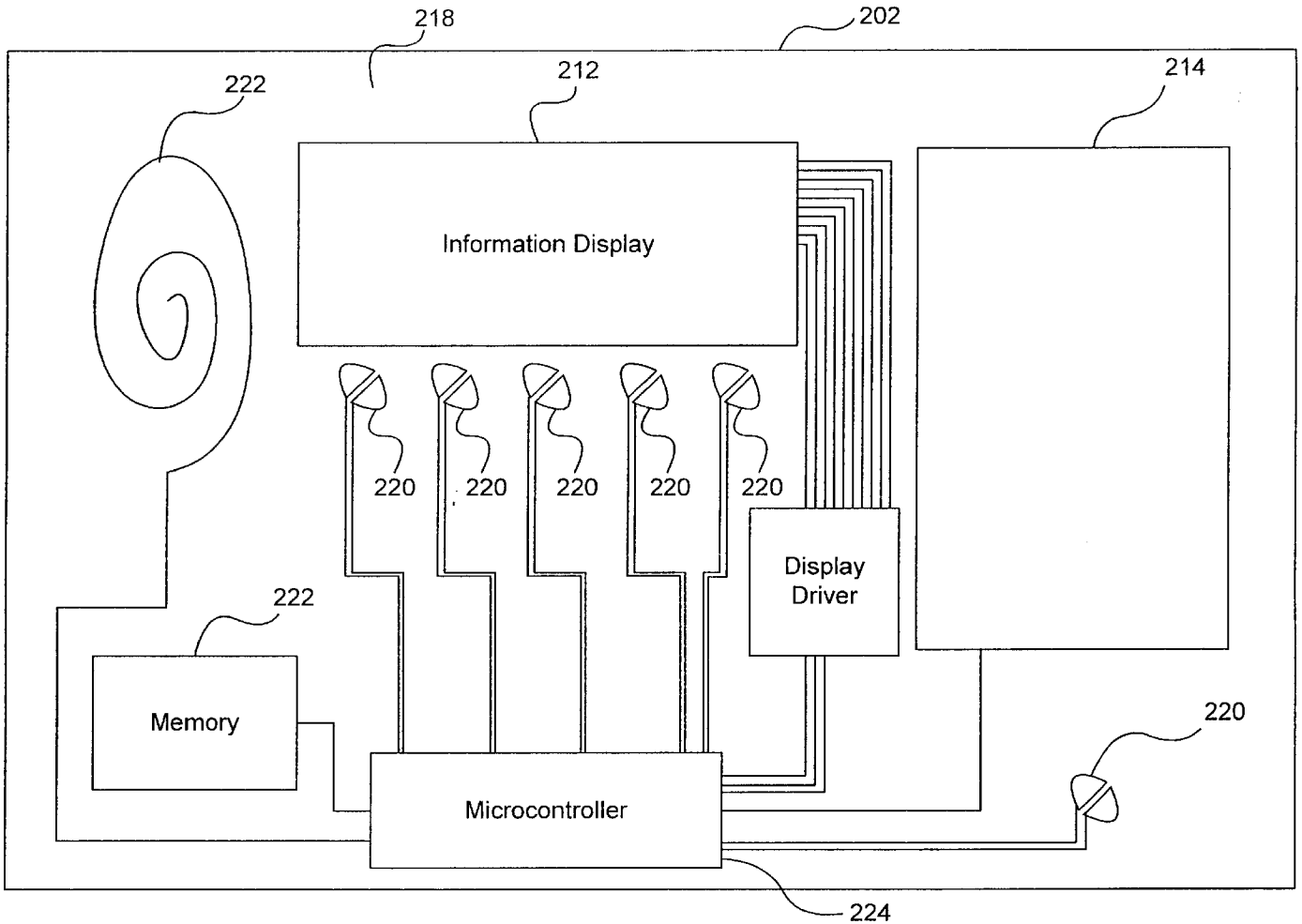
FIG. 2H depicts a more detailed illustration of an upper surface of the backing sheet shown in FIG. 2G.

In the exemplary embodiment depicted, the inward facing surface 218 of the backing layer 202, provides the foundation to which the componentry involved in the data collection device is attached. FIG. 2F shows the inward facing, or top surface 218 of the backing layer 202. FIG. 2G shows the outward facing, or bottom surface 230 of the backing layer 202. FIG. 2H depicts the arrangement of the inward facing, or top surface 218 (i.e., FIG. 2F) of the backing layer 202 in greater detail. The components affixed to the backing layer include: contact points 220 corresponding to the switches 210; the information display 212; memory means 222; a microcontroller 224; a data transfer device in the form of an RF antenna 226; and a power device in the form of the solar cell 214. The components can be interconnected by conductive ink that can be pre-printed onto the backing layer 202. The components can be affixed to the conductive ink interconnectors on the surface 218 of the backing layer 202 with a conductive adhesive at component connection contact points.

Operation of the data collection device 200 can involve displaying questions, stored in the memory 222, on the information display 212. Answers, in the form of selection indicators, appear at a base position of the information display 212, so that an answer choice appears above a switch 210. Actuation of a switch 210 selects the corresponding answer appearing at the base of the information display 212. The answer choice is sensed and recorded by the microcontroller 224. Recorded answers are transmitted to an external capture means (not shown) by means of the RF antenna 226.

Figure 3B:
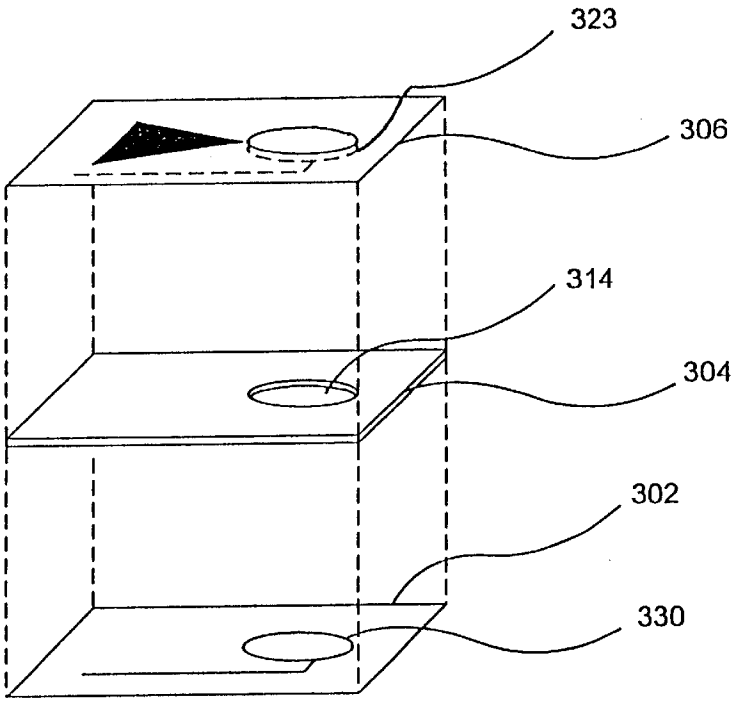
FIGS. 3A and 3B depict exemplary switch arrangements in accordance with the invention.
Figure 3A:
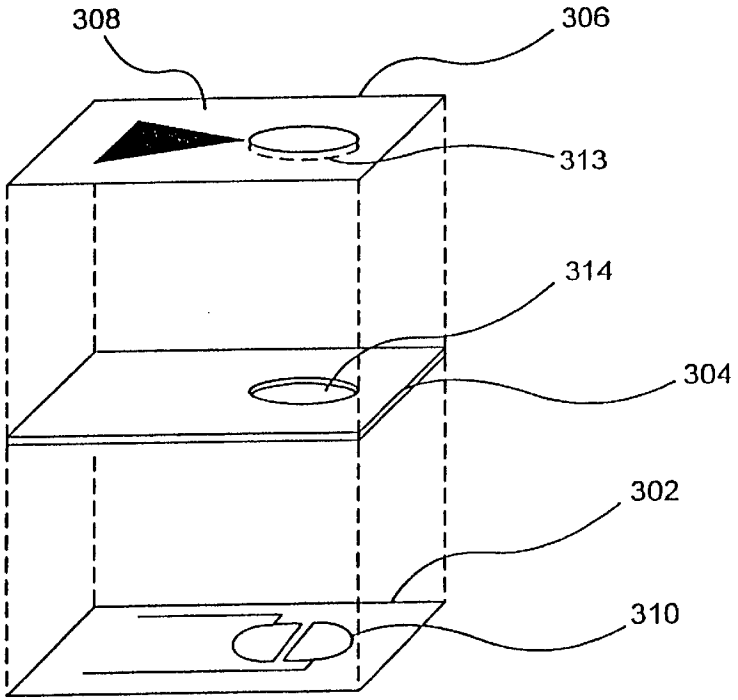

One of the basic functions of the data collection device is to provide a data input mechanism. The mechanism must convert a physical action by a respondent into an electronically detectable event. Such a mechanism is provided by switches. An example of switch arrangements, or soft-switches that can be utilized in the aforedescribed exemplary embodiment are depicted in FIGS. 3A and 3B. FIG. 3A illustrates a shorting bar design. A top layer 302 can be made from a flexible material that has a conductive point, or shorting bar 313, printed or affixed to the back surface of a switch indicator 308 (the shorting bar is depicted as a dashed line for illustrative purposes). A circuit is completed to indicate a switching condition by applying pressure to the switch indicator 308 to bring the shorting bar 313 into contact with a switch detect arrangement 310 on a backing layer 306. A middle sheet 304 in the arrangement has an aperture 314 that serves to separate the shorting bar from the switch detect circuit 310. When the switch actuation is released, the tension of the top layer material retracts the shorting bar from contact. This provides the desired momentary contact switch action.

In an alternative arrangement, depicted in FIG. 3B, a half switch design is depicted wherein a top half 323 of a switch is printed or affixed to the back surface of top layer 306 and a bottom half 330 of a switch is printed or affixed to the top surface of a backing layer 302. The two switch halves, 323 and 330, are separated by a middle layer 304 having an aperture 314 defined therein. One of the two halves carries a potential while the opposing switch half is connected to a switch detection port (not shown) on a microcontroller, or like device. A switching condition is indicated when an operator pushes the switch indicator to bring the two halves, 323 and 330, into contact thereby supplying potential to the switch detection port. It is worth noting that the shorting bar 313 in FIG. 3A and the top switch half 323 in FIG. 3B can be provided by supplying an additional layer between the top layers and middle layers. By doing so, printing or affixing elements to the inward facing surface of the top layers can be avoided.

Other possible switch mechanisms that can be used include membrane switches and capacitive switches. An arrangement of membrane switches can be laminated onto the top surface of the backing layer 102, or affixed to the backing layer by appropriate means. Capacitive switches, that sense capacitive changes brought about by fingertip contact, can be fabricated much in the same way as the half switch and shorting bar design, described above, albeit with a suitable dielectric interspersed at appropriate mid layer locations.

Figure 4:
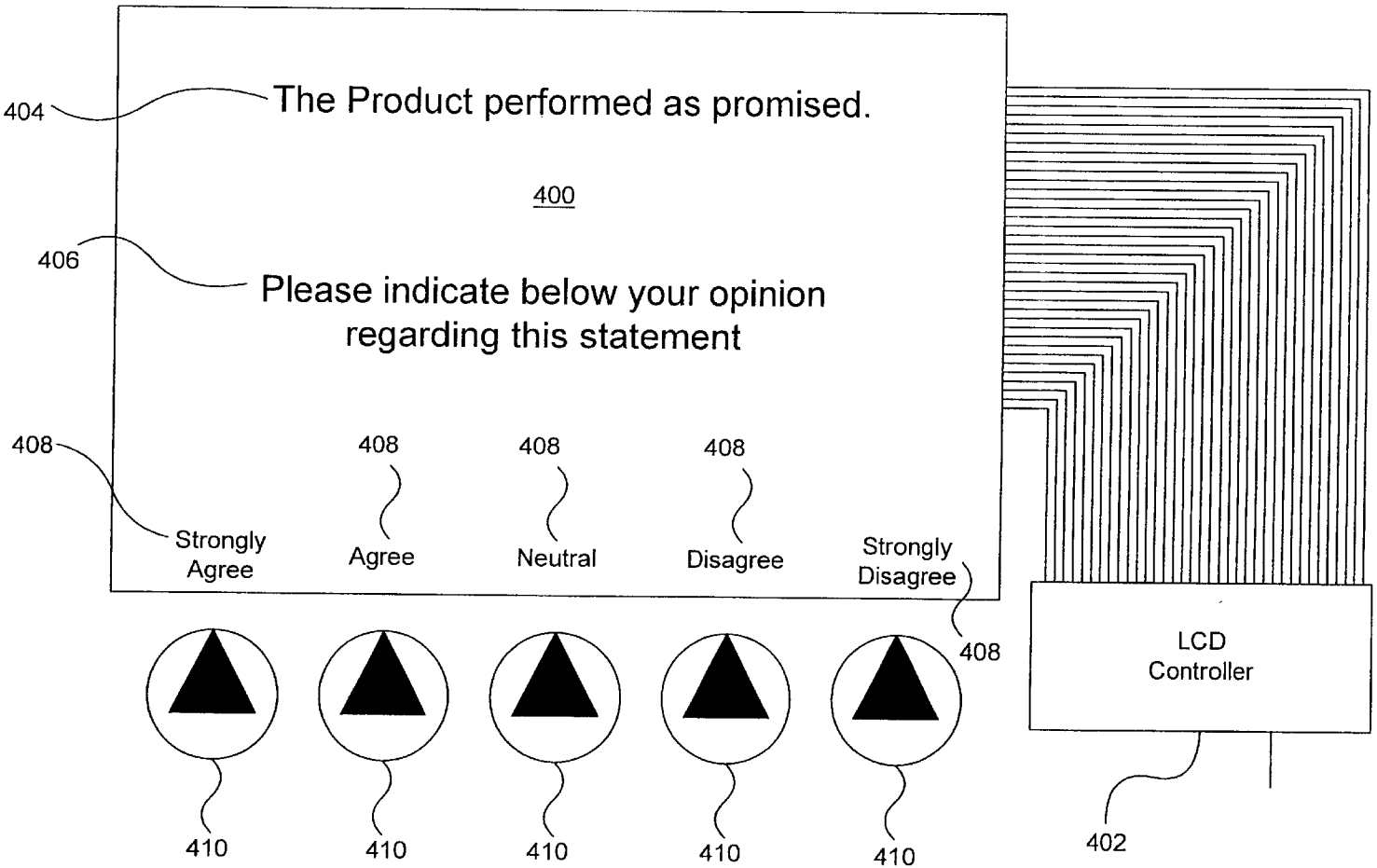
FIG. 4 depicts an information display in an exemplary embodiment of the invention.

An information display can be selected from any of a number of well known technologies. These include, but are not limited to: liquid crystal displays and indicators (LCD), encapsulated liquid crystal displays and indicators (NCAP), light emitting diodes (LED), electroluminescent displays (EL), and break out indicators. LCD technologies are used, in a preferred embodiment, because of their cost, construction characteristics (i.e., low profile, durable), and low power requirements. Commercial LCDs are readily available from manufacturers such as Raychem, Seiko and Casio. An exemplary information display, in the form of an LCD, is depicted in FIG. 4. The LCD 400 can operate in concert with softswitches 410 to facilitate response entry by an operator. The LCD 400 may operate in combination with an LCD controller 402 (shown for illustrative purposes) that communicates with a microcontroller (not shown). The LCD 400 can be used to display information, such as a survey statement 404, to which a respondent is invited to supply a response 406. The LCD 400 can display softswitch labels 408 that correspond to the softswitches 410. Contact with an appropriate softswitch 410 indicates an answer selection.

Memory can be in the form of a separate memory 222, as depicted in FIG. 2H. Alternatively, a microcontroller memory, or a combination of microcontroller and separate memories can be used. One or more memories serve the functions of storing operating instructions for controlling the data collection device 200, and for storing response information entered by a respondent. The particular memory configuration and capacity is determined by the operational requirements of the data collection device. In accordance with preferred embodiments, operating instructions are stored in ROM memory having a low power requirement. Fetch rates need not be particularly fast, therefore low speed, low cost memory can be selected for use. Responses can be stored in a dynamic memory, such as RAM. In a preferred embodiment, RAM memory incorporating ferrous memory technology is used to alleviate the requirement for refreshing, thereby reducing power requirements. Alternatively, flash memory can be used for storing responses.

Logic for the data collector can be provided by a simple CPU or microcontroller. The particular microcontroller can be selected depending upon the operational requirements involved in the particular application. The microcontroller operates to control the information display, to supply questions, and to manage and collect responses from switch actuations or alphanumeric keyboard entries responding to questions. The microcontroller can also manage memory reads, memory writes, and data transfer processes. The microcontroller can be an off-the-shelf CPU programmed in accordance with the operational requirements for the particular application. Alternatively, an application specific integrated circuit (ASIC) microcontroller can be utilized that is designed for a particular application. For example, an inexpensive simple ASIC can be designed that combines an LCD controller and switch actuation detectors onto a single chip. Such a chip also can contain ROM for operating instruction and display contents, and ferrous RAM for storage of responses. An ASIC design requirement may be specific to an application, such as an electronic mail-in voting ballot. Alternatively, the ASIC can be designed to be particularly flexible or user configurable. An example of the latter is a generic electronic survey device that can be programmed with survey questions by a purchaser. This may involve providing the purchaser with PC software that can be used to program survey questions into the generic electronic survey devices prior to their distribution to respondents.

Figure 5A:
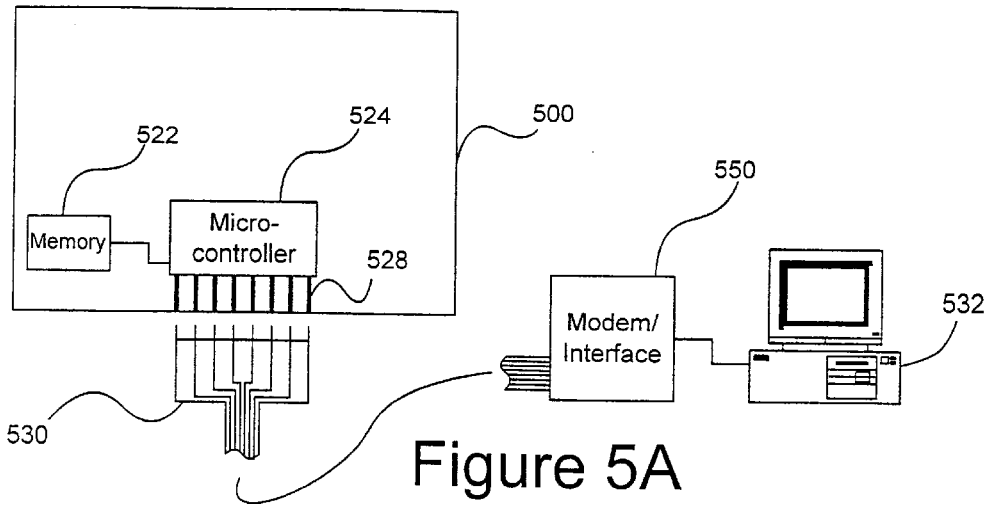
FIGS. 5A through 5C depict a data transceiving arrangements in accordance with exemplary embodiments of the invention.

Interfacing with a data collection device to program a microcontroller, and/or to gather response information collected within the data collection device, can be achieved by a variety of mechanisms. An exemplary interface device, in the form of a physical connector 528, is depicted in FIG. 5A. The physical connector 528 is comprised of a parallel 8-bit data bus that corresponds to an 8-bit microcontroller 524. The physical connector 528 can be fashioned to abut a peripheral edge of the data collector device 500. A data processing system, such as a personal computer 532, can communicate with the data collection device 500 using a connector 530 adapted to interface with the physical connector 528. One skilled in the art will readily appreciate that a serial connection scheme can be used in the alternative. The connector 530 can interface the data collection device 500 with a personal computer 532 via the personal computer's serial or parallel port. Software can be supplied for the PC that facilitates the gathering and formatting of data gathered from the data collection device 500. One skilled in the art will recognize that the selection of an interface may depend on the microcontroller used, and that any of the standard interface devices, such as an RS-232 or other standardized Modem interface, can be adapted to interface between the data collection device and a PC or other off-board interfacing means.

Figure 5B:
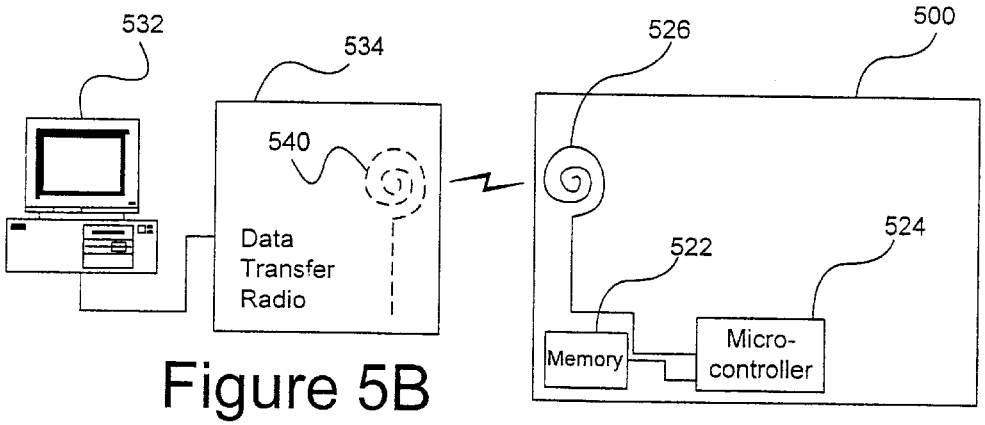

In an alternative configuration in accordance with the invention, a data transfer means can take the form of a radio frequency (RF) transmission device, such as an antenna. An exemplary embodiment of an RF transceiver arrangement is depicted in FIG. 5B. The manual steps necessary to complete a physical connection associated with the arrangement of FIG. 5A can be avoided by utilizing an RF element 526 to interface the microcontroller 524. The RF element is in the form of an antenna 526 that is designed to communicate with an RF transceiver unit, or data transfer radio 534, connected to a parallel or serial port on a PC 532. Through its transceiver antenna 540, the data collection device 500 can be instructed by the data transfer radio 534 (as controlled by the PC) to supply data gathered and stored within the memory 522. The RF interface also can be used by the PC 532 to download instructions to the data collection device 500.

Figure 5C:
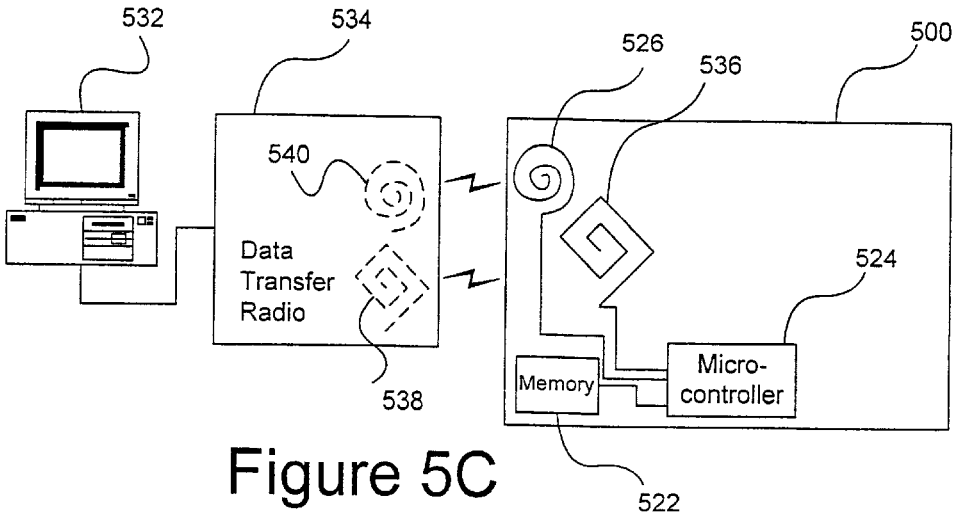

An RF interface to the data collection device 500 can be of a passive or active variety. A passive RF data transfer configuration is depicted in FIG. 5C. In the figure, the data collection device 500 contains a transceiving antenna 526 and a power supply antenna 536. A data transfer radio 534 is connected to a serial or parallel port of a PC 532. The data transfer radio 534 contains a power supply antenna 538 and a transceiving antenna 540. When the data collection device 500 is positioned proximate to the radio device 534, emissions from the power supply antenna 538 in the radio device 534 are received by the power supply antenna 536 of the data collection device 500, thereby supplying operating power to the data collection device 500. Such power is used by the data collection device 500 to communicate with the data transfer radio 534, and consequently with the PC 532, through respective transceiving antennas 526 and 540. In an alternative embodiment having an active RF communications scheme, a battery can be supplied in the data collection device 500 to provide power for the transceiving antenna 526.

Another exemplary configuration having an RF data transfer capability involves using an RF tag element. RF tags, such as those offered by Micron Communications, Inc., of Boise, Idaho are electronic identification devices that are designed to emit an identification code upon receiving a designated RF signal. The identification code is usually several bytes long an includes information such as a Standard Industrial Classification Code (SIC), or a standardized UCC/EAN code. Such tags can be used as automatic identifiers on shipping containers, to track inventory within a warehouse, or to track a product as it moves through an assembly line process (e.g., an automobile).

In accordance with systems incorporating the invention, the RF tag emits, not a fixed code, but rather information gathered and stored in dynamic memory within the RF tag. Micron's MicroStamp™ line of products are particularly well suited because of their low profile construction, security features, operating flexibility, transmission range (up to 50 feet) and low cost. This line of RF tags are available in a variety of models that include writable memories and 8-bit microprocessors in addition to RF communication elements. A data collection device equipped with an RF tag in accordance with the invention needs only to be placed within the proximity of a corresponding data transfer radio that facilitates an interface between the RF tag-equipped data collector and a PC, or other data capture system. When not in communication with a radio capture system, the RF tag idles in a dormant operating mode. Reception circuitry in the tag, upon receiving an appropriate signal, wakes the RF tag, whereafter communication can take place.

There are several advantages to using the RF data transfer scheme. Data can be collected from data collection devices without having to make a physical connection with any of the data collection device's componentry. Consequently, data can be gathered from the collection devices by merely bringing them into proximity with a data transfer radio. This facilitates rapid turn around in the data capture process following collection and/or return of the data collection devices. Furthermore, if the data collection devices are collected by mail, they need not be removed from their envelopes as data can simply by gathered by RF communication. In addition, identification codes can be maintained and transmitted by the RF tags to facilitate batch processing of data collection devices. As discussed in greater detail below, security and error correction can be provided by encrypting communications between the data collection device and the radio data transfer device and by using error correction coding and/or checksums.

Power for the data collection device can be supplied by either battery, photovoltaic means (e.g., a solar cell), or a combination of both. The choice of power supplies can depend on the power requirements of the data collection device and the cost considerations involved with the particular application. A more sophisticated, or complex, application specific data collection device can require more processing capability and consequently more operating power. The size of a solar cell required to supply the requisite amount of power may be cost prohibitive. In such a case, a low profile battery used individually, or in combination, with a solar cell may be a more cost effective solution. Such batteries are readily available in the marketplace. Examples include Micron's low profile lithium batteries and Unicell Corporation's line of flatpack batteries.

The selection of component package formats for a data collection device are preferably selected with eye to component height, or profile, and costs. Low-profile component package configurations such as leadless chip carrier, J-lead chip carrier, and like surface mount carrier technologies can be used for IC components. Discrete elements can be in the form of discrete leadless components, small-outline transistors, and the like. Flipdie formatted components are deemed particularly suitable, because they do not ordinarily involve component packaging or wire leads. In flipdie technology, only the silicon chip itself is used and is affixed directly to interconnections. Flipdie components are directly connected to interconnectors by means of raised wirebond contact points on the flipdie component surface.

The choice of materials and construction techniques of a data collection device involves many factors. A device in accordance with the invention can be designed for single- or limited-use operation. Consequently, materials and construction techniques are not necessarily selected with a view to operating longevity. More important are cost considerations that reduce data collection device unit costs while maintaining sufficient reliability and durability. It is a goal of the present invention to outperform, from an overall cost standpoint, conventional paper-driven data gathering systems that involve large initial investments in optical scanning systems, sophisticated software, and affiliated computers. Conventional systems also entail considerable labor cost attributable to the correction and editing process for mismarked or unreadable materials that cannot be interpreted by conventional automated systems, as discussed above in the Background section.

With respect to the selection of foundation, or sheet layer materials for the formation of data collection device, the embodiment described above with respect to FIGS. 2A through 2G merely depicts an exemplary three layer configuration. Other configurations may involve more or fewer layers depending on the operational, functional and cost factors involved. Materials selected for the formation of the top middle and backing layers 202, 204 and 206, respectively, can be selected from any appropriate material such as paper, polystyrene or high-density styrofoam sheeting, polycarbonate, plastic, or any combination of these. Any of the aforementioned materials can be reinforced with synthetic or natural fibers, or be impregnated with compounds to enhance strength and durability. The backing sheet material should be selected taking into account its receptivity to conductive inks and adhesive compounds used to affix the various components to its surface. The aforementioned polycarbonate material is deemed particularly appropriate as it possesses excellent component adhesion properties and is receptive to conductive graphite as a printed interconnector compound.

The middle layer, if used, can have a greater profile than the top or backing layer in order to define a space between the conductive points behind the switches 210 of the top sheet and the contact points 220 on the backing sheets (see FIG. 2). The middle sheet can be formed from a dense foam compound to add rigidity to the data collection device, to give it a more durable characteristic, and better tactile response.

In an exemplary three-layer embodiment, a thin polycarbonate backing sheet, having a suitable combination of components attached thereto, is covered by a slightly thicker polystyrene midsheet. The midsheet has appropriate apertures formed therein to receive an information display, softswitch spaces, LEDs, and a solar cell (if used). The midsheet is pre-printed, on its top surface, with switch locations and identities, and other pertinent information. The midsheet is covered by a top sheet of thin transparent plastic, that is heat sealed to the upper surface of the midsheet.

Because it is desirable to provide an electronic data collection device that can easily be sent through the regular mail, or by courier, it is a goal for embodiments of the invention to be compatible with regular mail forms. That is, the device should be dimensionally arranged in such a way that it can be readily inserted into a standardized envelope, or in a non-folded embodiment, in a standard large mailer. Consider for example, an arrangement using standard 8½ inch by 11 inch sheets as backing and top sheet materials. The height or profile of such an arrangement is dictated by the thickness of a thickest component sandwiched between the sheets. In an exemplary embodiment of the invention incorporating the aforementioned Micron MicroStamp™ device, a typical model of such a device has a profile height of 0.09 inches (approximately 2.29 mm). Thus, the height or profile of the electronic data collection device would be slightly thicker. Therefore, the thickness of exemplary embodiments would typically be on the order of 1/80 to 1/110 of the width and/or length. Of course use of a Micron MicroStamp™ arrangement in a four inch by five inch note card size arrangement would correspond to a ratio of thickness on the order of 1/40 to 1/50 of the width and/or length. That is, a thickness of an exemplary apparatus is in a range of 0.09 and 0.15 inches and said first and second lateral dimensions are in the range of 3.0 to 14.5. The foregoing sheet sizes are merely exemplary, and are provided for illustrative purposes to demonstrate possible thickness ratios of exemplary embodiments of the invention.

Conductive inks are readily available through commercial vendors. Manufactures of such compounds include 3M. As an alternative to conductive ink, a conductive adhesive can be used to form conductive interconnectors. Conductive inks and/or adhesives can be applied to a layer or sheet using conventional offset printing, silk screen processes, or photolithographic techniques. Heat sealing can be used as a curing process to fix inks or adhesives. In an alternative interconnector arrangement, a laminated conductor sheet can be used as a backing layer. Components can be affixed to the laminated sheet whereby component contact points penetrate the laminated membrane to attach to the conductors.

Components can be affixed to a backing sheet by use of conductive adhesives at contact points. An example of a suitable conductive adhesive is Uniaxial epoxy compound by Uniax Corporation of Bloomfield Hills, Mich. Uniaxial epoxy compound is a combination of epoxy and nickel (Ni) powder. In addition, component shielding can be provided, to supply electronic isolation and mechanical protection, by bonding component bodies to a backing sheet by dabbing plastic, ceramic, or epoxy adhesives at component attachment locations. The aforementioned Uniaxial epoxy compound is especially well suited as it forms electrically conductive contacts at component contact points, while remaining non-conductive away from component contact points. In an alternative arrangement, various components and interconnectors can be suspended between laminated sheets. An upper laminated sheet can have transparent window portions for receiving an information display, solar cell, and LEDs. Opaque portions of the upper laminated sheet can be printed with an appropriate topology. One skilled in the art will readily recognize that, regardless of the particular layer or laminated configuration, the entire process of laying out interconnector patterns on a backing sheet, affixing components thereon, overlaying and bonding additional sheets, can be performed by automated processes and systems.

Figure 6A:
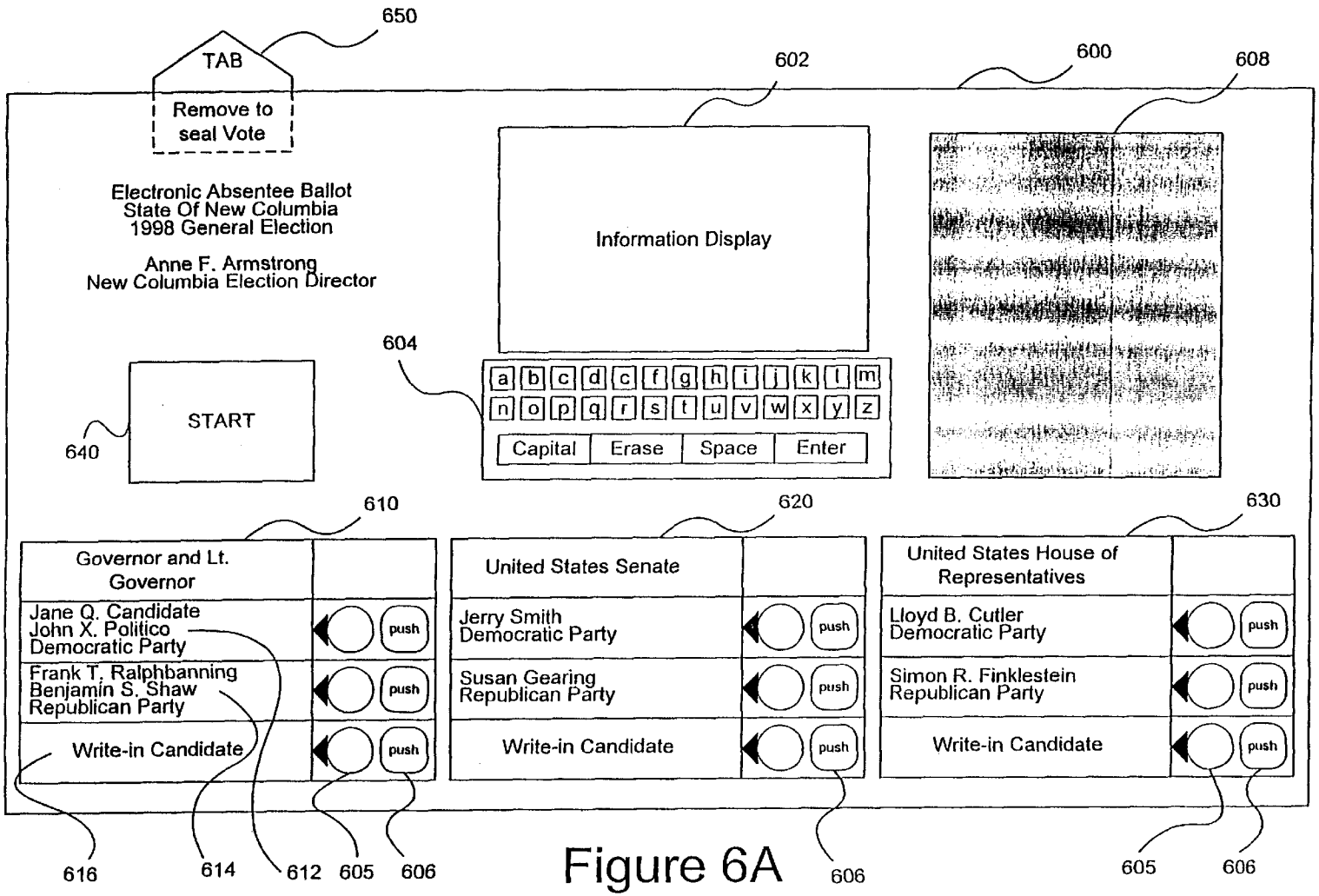
FIG. 6A depicts an electronic mail-in ballot in accordance with an exemplary embodiment of the invention.

Arrangements in accordance with the invention can be devised in application specific configurations. An example is an electronic mail-in ballot for use as an absentee ballot in an election. The topology of an exemplary mail-in ballot 600 is depicted in FIG. 6A. The mail-in ballot 600 comprises an information display 602, such as an LCD; input means in form of an alphanumeric keypad 604, and switches 606; and a power source in the form of a solar cell 608. The topology of the form is substantially identical to that of a conventional mail-in ballot. That is, candidates up for election appear under designated ballot sections for, e.g., State Governor 610, U.S. Senate 620, and U.S. House of Representatives 630. The Gubernatorial candidates may consist of a Republican candidate 612, a Democratic candidate 614, and a write-in candidate 616. Appearing next to each candidate is a switch 606 and a selection indicator 605. The selection indicator 605 can be an LCD, LED, EL element, or the like, that indicates the selection of a candidate when the corresponding switch 606 is actuated.

Use of the mail-in ballot can be carried out as follows. The voter can be provided with a preliminary set of instructions for initial operation of the mail-in ballot, for instance to press the start switch 640. The start key notifies a microcontroller (not shown) to begin operation. The microcontroller substantially controls and monitors all functions of the electronic mail-in ballot 600. One having ordinary skill in the art would be capable of programming an instruction set for the microcontroller to carry out germane tasks involved with the operation of the electronic mail-in ballot.

A first task performed by the microcontroller can be to display voting instructions in the information display 602. A voter selects a candidate by actuating a switch 606 corresponding to the candidate's name. Upon sensing the selection, the microcontroller illuminates a selection indicator 605 corresponding to the actuated switch and records the selection. The voter can change their selection by actuating another switch. The microcontroller illuminates the selection indicator 605 corresponding to that switch, turns off the previously selected indicator, and records the new choice.

If a switch corresponding to the write-in 616 is actuated, instructions appear in the information display 602 directing the voter to use the alphanumeric keypad 604 to enter the name. As the name is typed in on the keypad 604, it is displayed on the LCD indicator 602. After entering the name, the voter can hit the <enter> key to record the write-in candidate. When the voter has completed their selections, a tab 650 is to be torn from the ballot to seal the vote. The tab 650 can be a perforated, or tear away section of the mail-in ballot that includes a portion of the printed interconnectors used to interconnect critical mail-in ballot components thereby "sealing" the ballot. The mail-in ballot 600 can be designed so that removal of the tab makes it practically impossible to change the recorded voting information. Such a tear away tab is not limited to use in an electronic mail-in ballot, as will be explained in greater detail below.

Following completion of the ballot and removal of the tab, the ballot can be placed in a pre-addressed envelope designed (i.e., sized) to receive the ballot 600. The voter may be required to sign the return envelope, or a voter card supplied therewith, to certify the vote. Once returned, voting data can be harvested from the ballot via electronic means. In a preferred embodiment, the ballot 600 includes an RF data transfer device so that voting information can be recorded from the ballot by radio capture. In this way, the ballot does not have to be removed from the envelope for data gathering purposes. After the information is gathered, the envelope can be discarded, or retained for a period of time in the event of a re-count.

Figure 6B:
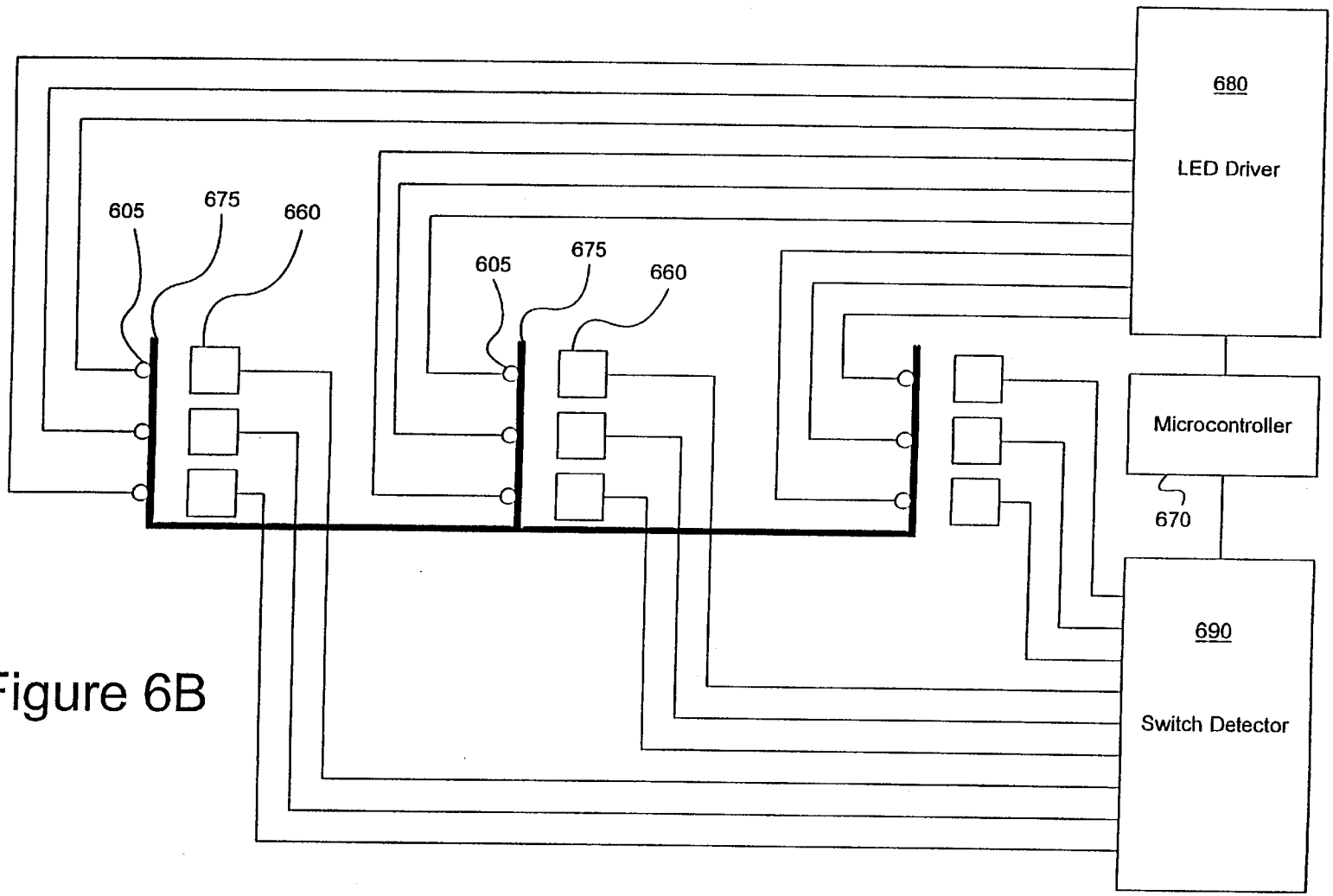
FIG. 6B depicts an exemplary backing sheet corresponding to the switch arrangement of FIG. 6A.

A portion of a backing layer of the electronic mail-in ballot is depicted in FIG. 6B. The depicted portion of the backing layer corresponds to the switches 606 and associated selection indicators 605. A half switch arrangement is depicted wherein a bottom half 660 of a switch 606 receives contact from a corresponding switch top half affixed to the bottom surface of a top sheet (not shown) when a switch is actuated (i.e., depressed). A microcontroller 670 receives an indication that a switch has been actuated, and responds by illuminating a corresponding selection indicator LED 605. The selection indicator LEDs 605 operate through an LED driver 680, which is controlled by the microcontroller 670. The LEDs receive operating power from an LED power bus 675. Switch actuation may be detected through a switch detector 690.

Some additional features of a mail-in ballot can include encrypting voting data transmitted between a mail-in ballot 600 and a radio data capture device to enhance data security. A help switch (not shown) can be provided that causes a help menu to be displayed on the LCD 602. The alphanumeric keyboard 604 can be used to select and review help topics.

An ASIC microcontroller can be designed and used that is tailored for the simple data collection requirements of a mail-in ballot system. Current technologies make it financially feasible to use such devices in a single-use data collection systems incorporating the present invention. Alternatively, a general use processor can be programmed in accordance with the functional needs of mail-in ballot application. Because the electronic mail-in ballot is substantially a one use (i.e., one election) device, componentry and materials can be selected to reduce unit costs. It is desirable to supply a more cost effective solution to mail-in balloting by a designing an electronic balloting system whose total cost (i.e., unit cost, mailing, and data gathering) is below that of a conventional system whose costs include optical scanning equipment, manual data entry, and correction. In addition, the turn around time between collection of the mail-in ballots and the gathering of data therefrom is improved over conventional processes.

The mail-in ballot is mailed to appropriate voters (e.g., absentee voters) in an envelope along with a return envelope. The electronic ballot is preferably designed to be sufficiently durable to be sent and returned in the regular mail, however, envelopes may be marked "do not bend" in an attempt to mitigate damage. The mail-in ballot also can be constructed to sustain folding by utilizing appropriate materials (e.g., flexible conductive ink), arranging components accordingly, and indicating "fold-along" markers. In addition, components can be adhered within the data collection device using a protective bonding material, such as plastic or epoxy, to add mechanical rigidity.

Figure 7:
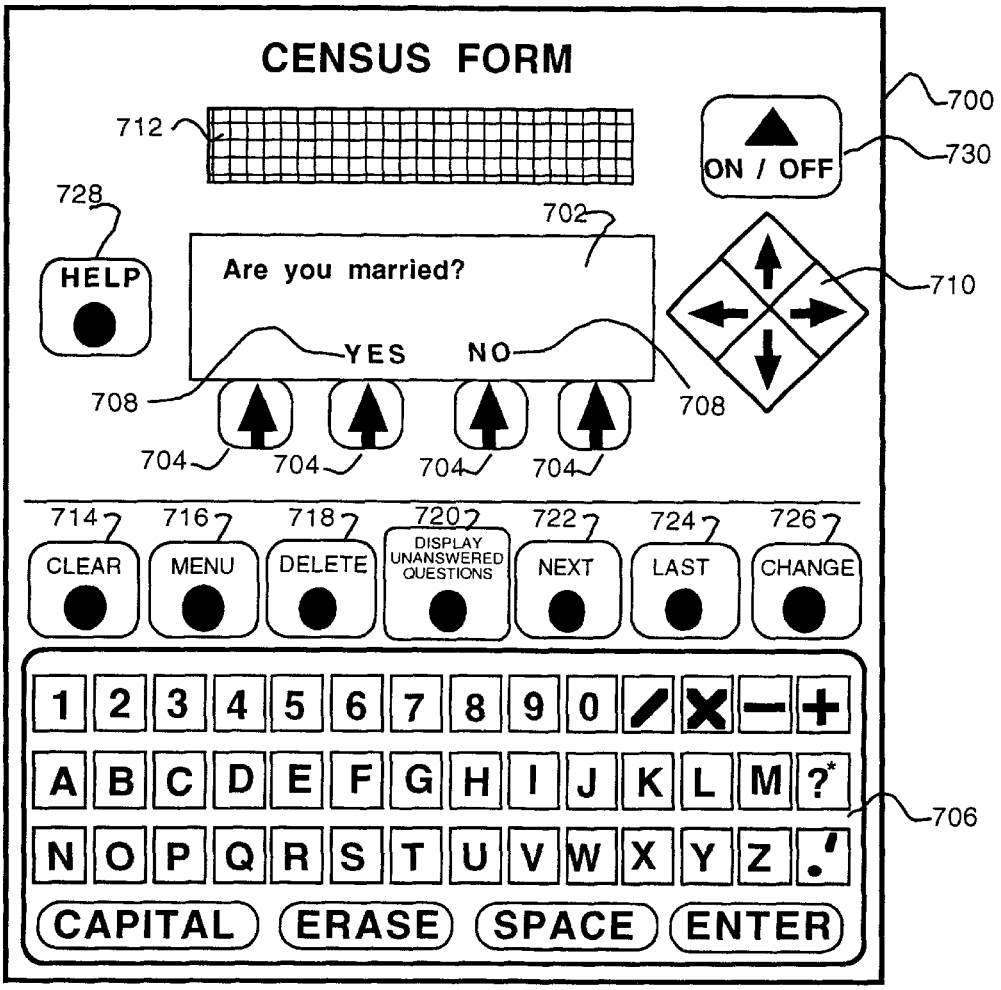
FIG. 7 depicts an electronic census form in accordance with an exemplary embodiment of the invention.

In another application specific embodiment, an electronic data collection device in accordance with the invention can be used as an electronic census form 700 as depicted in FIG. 7. The topology of the electronic census form 700 is designed to facilitate interactive operation in accordance with the functional requirements associated with gathering census data. In the depicted embodiment, census questions are displayed in an information display, such as an LCD 702. Answers to the census questions can be entered by a respondent using either a variety of softswitches 704 which correspond to softswitch labels 708 appearing on the display 702. Or answers can be entered using an alphanumeric keypad 706. A cursor control device 710 can be used to manipulate a cursor within the LCD 702, or to assist in scrolling through census questions. A power supply can be in the form of a solar cell 712 which can operate in combination with a battery (not shown). Additional editing switches can include a clear key 714 for clearing an answer response; a menu key 716 for selecting language options, help menus, or census questions; a delete key for deleting a character; a display unanswered questions key for bringing up unanswered questions; a next key 722 for moving to a next census question; a last key 724 for skipping to a previous census question; and a change key 726 for replacing a previously entered answer. A help key 728 also can be provided to supply a respondent with a help menu.

Operation of the electronic census device 700 is substantially controlled by a microcontroller (not shown). One having ordinary skill in the art would be capable of programming an instruction set for the microcontroller to carry out germane tasks involved with the operation of the electronic census device. Key operation and display contents are controlled by the microcontroller to facilitate interactive operation. Actuation of the ON/OFF switch 730 initiates operation of the electronic census form 730. After initializing, the microcontroller can display a question on the LCD 702 requesting that the respondent indicate a language preference. Each of the softswitches can correspond to a language option displayed above a respective switch (e.g., english, spanish, arabic or chinese). After indicating a language preference, subsequent questions are supplied in the language according to the language selection. As shown in FIG. 7, a typical census question such as: "Are you Married", may be displayed on the LCD 702, in accordance with the sequence of questions stored in the microcontroller (or in a separate memory). The microcontroller monitors and records responses entered by the respondent. If the respondent fails to actuate a softswitch 704 corresponding to an answer choice (i.e., "yes" or "no"), the electronic census form 700 can provide an audible response indicating an improper selection. Such audible feedback can be supplied by provision of a piezoelectric component (not shown).

Figure 8:
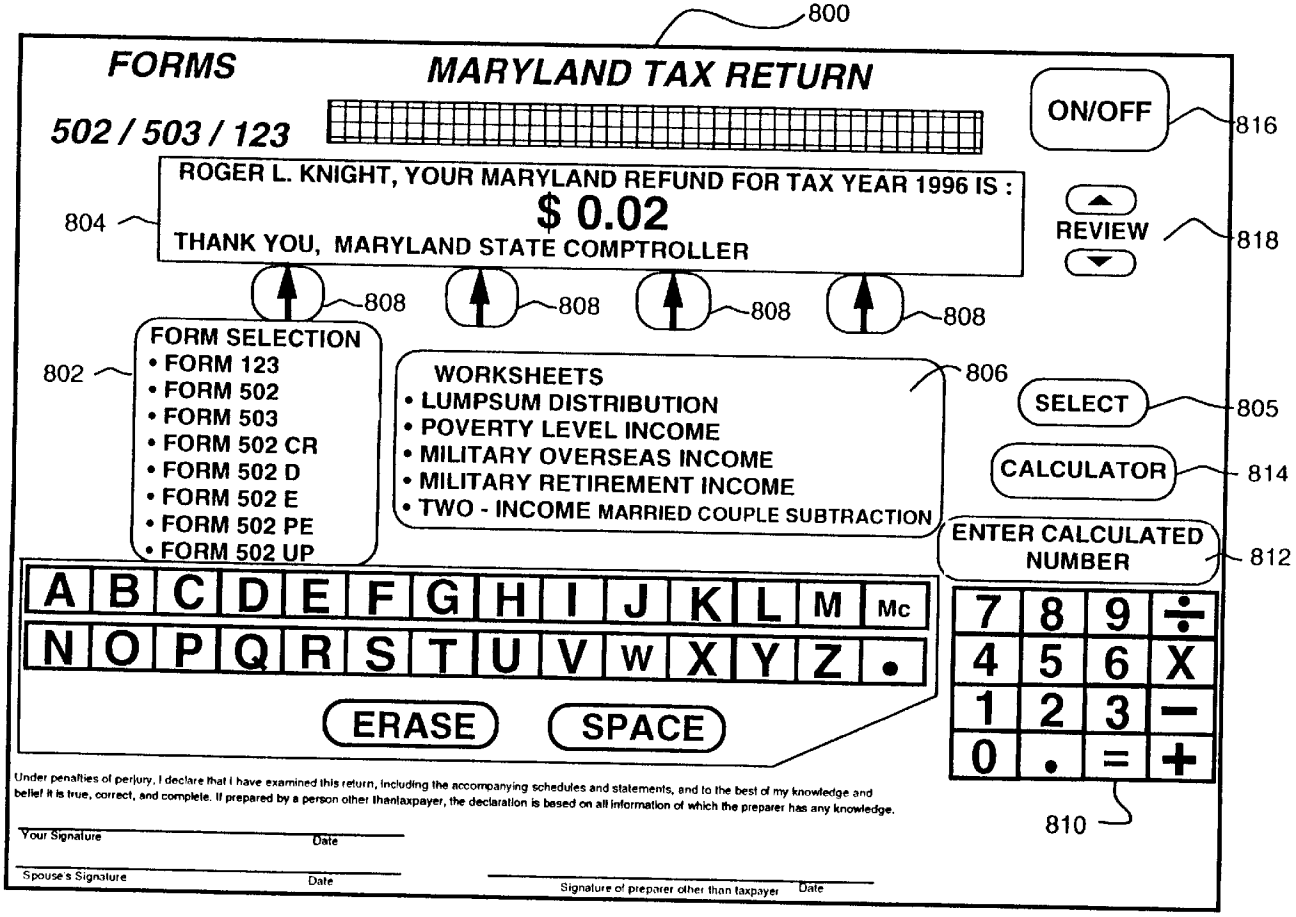
FIG. 8 depicts an electronic tax return in accordance with an exemplary embodiment of the invention.

An example of another application specific embodiment, as depicted in FIG. 8, is a data collection device configured as an electronic tax form 800. The electronic tax form 800 can be designed to combine relevant tax forms (full-time resident regular taxpayer, part year resident taxpayer, and appendixes) into one medium. The appropriate form is selected by scrolling through and selecting an appropriate form from a form selection display 802. A description of a form highlighted in the form selection display 802 can be displayed in a main information display 804 to assist a user in making a selection. A selection can be made using a SELECT softswitch 805. The main information display 804 also can be used as a worksheet space to assist a user in calculating income for various earnings and compensation scenarios. The particular worksheet can be selected from a worksheet selection menu 806 using the SELECT softswitch 805. Softswitches 808 for selecting softswitch labels displayed on the main information display 804 also can be provided. A calculator 810 also can be integrated into the electronic tax form 800. Activation of the calculator can be achieved by pressing the "CALCULATOR" key 814. The result of a calculation performed on the calculator can be entered as an answer to a response by actuating the "ENTER CALCULATED NUMBER" key 812.

Operation of the electronic tax form is controlled by a microcontroller (not shown). Pressing the ON/OFF key 816 activates the microcontroller causing it to display an initial set of operating instructions on the main information display 804. A user can be instructed to initially select an appropriate form from the form selection display 802. Highlighted items in the form selection display 802 can be scrolled through using the REVIEW keys 818. When the appropriate form is highlighted in the form selection display 802, the user selects that form by pressing the SELECT key 805. The microcontroller then operates in accordance with stored instructions corresponding to the particular tax form selected. Tax information queries for the selected form are subsequently displayed on the main information display 804.

Figure 9:
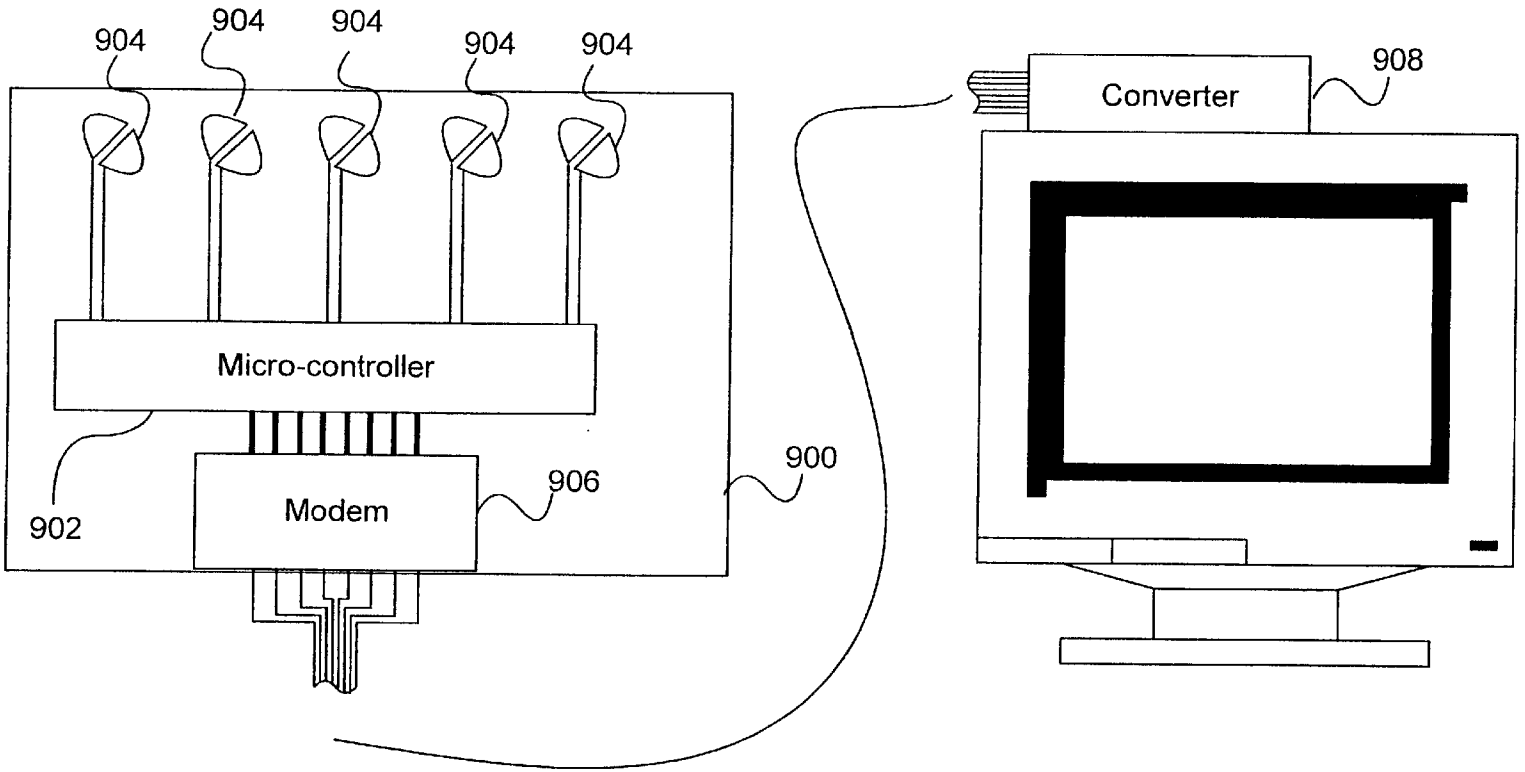
FIG. 9 depicts electronic cable television interface device in accordance with an exemplary embodiment of the invention.
Figure 10A:
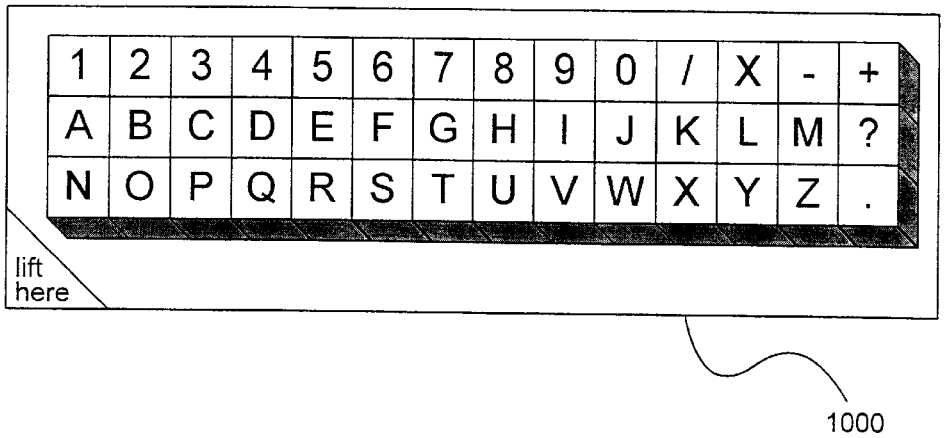
FIG. 10 depicts alphanumeric keyboard arrangements in accordance with the invention.
Figure 10B:
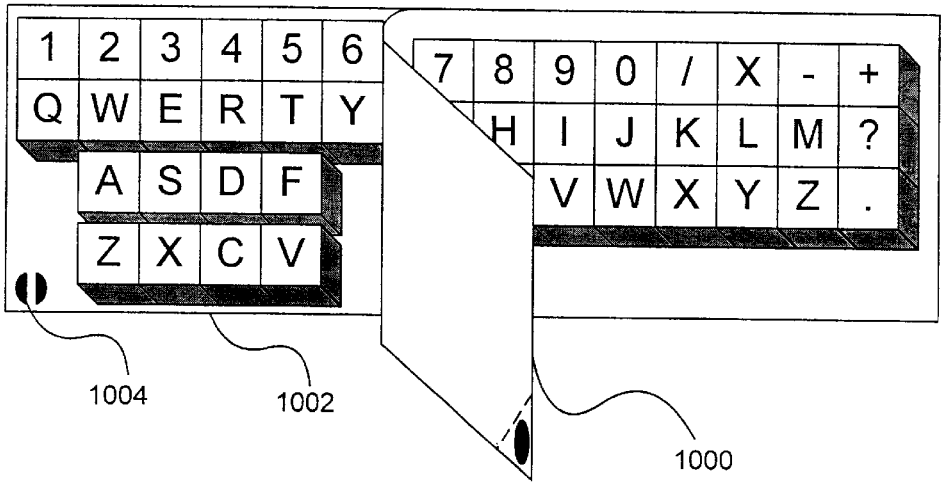

Application specific embodiments of a data collection device can be configured to collect application data for employment, insurance applications or claims, mail order forms, and virtually any other form or application that requires a respondent to answer questions or queries. An additional application specific embodiment is an inexpensive interface device for use in an interactive cable TV scenario. Such a device is depicted in FIG. 9. The interface device 900 is comprised of a microcontroller 902, that facilitates communication between a variety of softswitches 904, and a modem chip 906. The modem chip 906 is attached to an interface that can be connected to a cable TV converter 908 or telephone jack (not shown). A user viewing a home shopping channel can use the interface device 900 to control viewing options, bring up product information screens, purchase items, and/or cancel purchases. The softswitches 904 can be marked with appropriate labels indicating such action options. The interface device can be sent using the mail (e.g., in the form of direct mail material). The device 900 also can include an alphanumeric keyboard (not shown) that can be used to enter credit card data.

Figure 1:
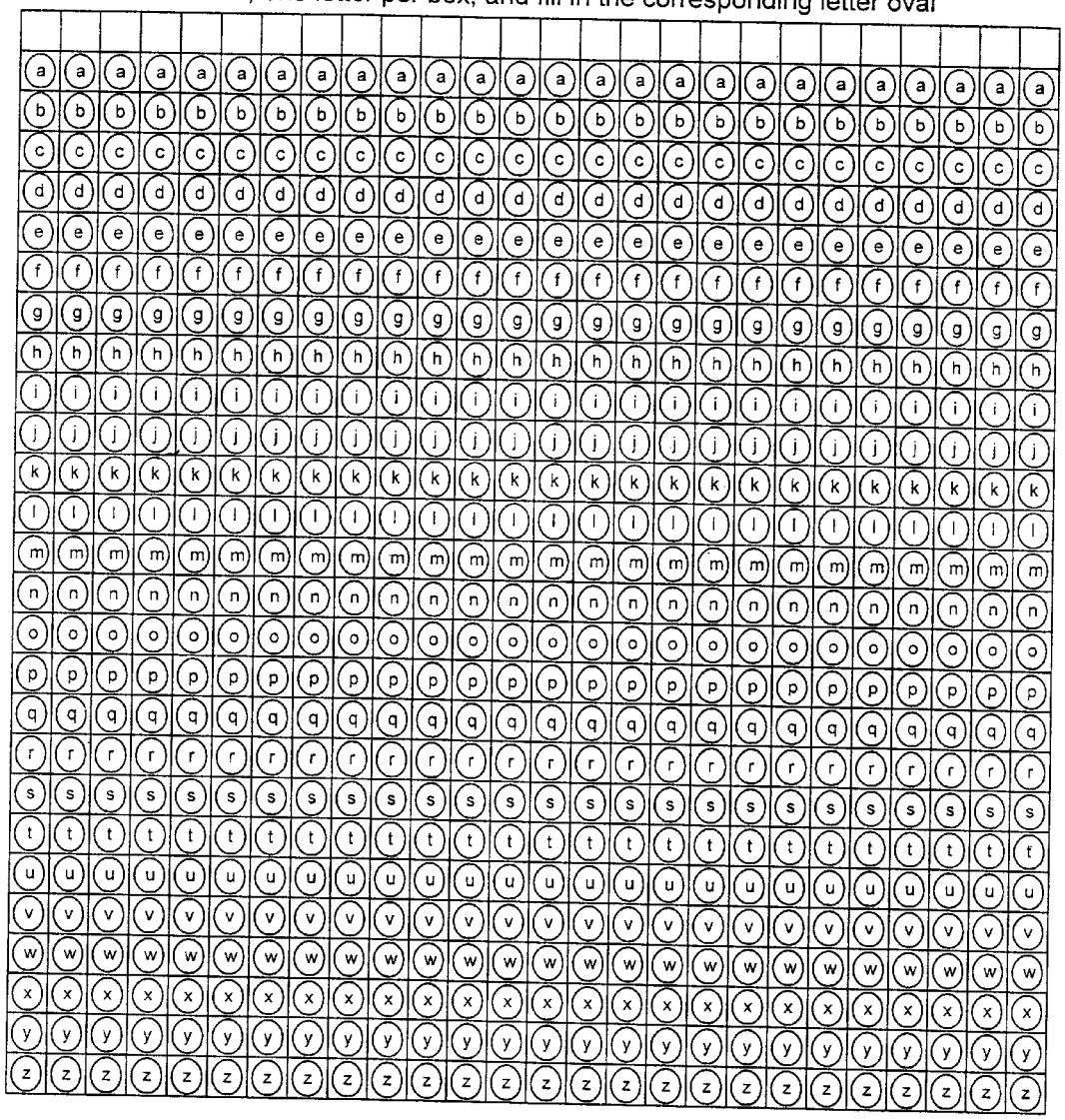
Figure 1 (Prior Art)
FIG. 1 depicts a conventional machine readable answer form designed for entry of alphanumeric data.

In embodiments of the invention having an alphanumeric keyboard, such as the electronic census form 700 of FIG. 7, a user may prefer to use a "QWERTY" keyboard configuration, rather than the A . . . Z configuration shown. Accordingly, another aspect of the invention is the provision of a tear-away keyboard face that provides a user with the option of selecting the alphanumeric keyboard configuration of their choice. A tear-away keyboard arrangement is depicted in FIGS. 1OA and lOB. In the depicted arrangement, an A through Z overlay keyboard 1000 is attached in a tear- or peel-away configuration over a fixed QWERTY keyboard 1002. If the A through Z keyboard is lifted off the fixed QWERTY keyboard, a switch contact 1004 is broken. Breaking of the switch contact alerts a microcontroller (not shown) to operate (i.e., detect switches) in accordance with the QWERTY layout.

Accuracy and security of data stored in an electronic data collection device, according to exemplary embodiments of the invention, are generally superior to that offered by conventional paper forms. This is primarily because a user directly enters response data that is stored in an electronic format rendering it difficult to tamper with. Additional security can be added by using tear-away tabs to break critical inter-component connections, and/or by utilizing checksums to enhance the security and integrity of stored response data.

Figure 11A:
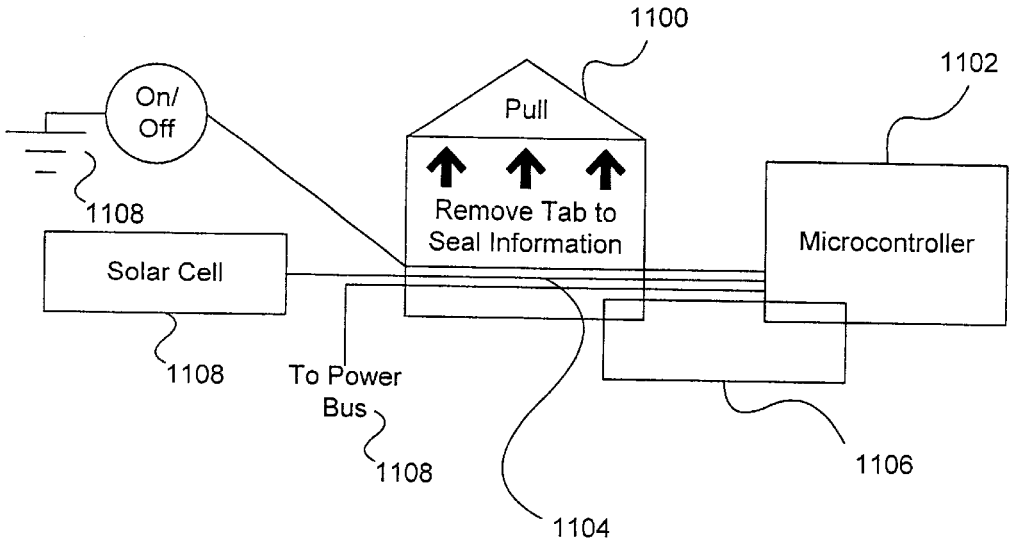
FIGS. 11A and 11B depict a data sealing tab in accordance with an exemplary embodiment of the invention.
Figure 11B:
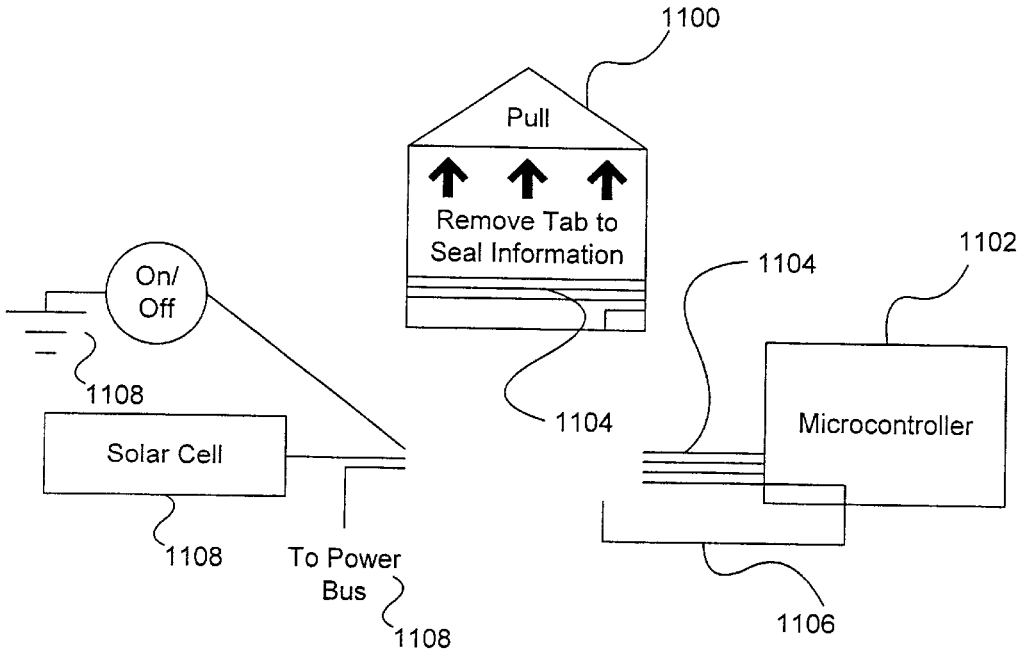

As mentioned briefly above with respect to the electronic mail-in ballot exemplary embodiment (see FIGS. 6A and 6B), a pull or tear away tab can be provided in an electronic data collection device in accordance with the invention to seal response data stored therein. An example of a tear-away arrangement is depicted in FIGS. 11A and 11B. A removable tear-away tab 1100 can be provided at a peripheral portion of a data collection device (not shown). The tear-away tab 1100 has one or more interconnectors 1104 and a seal control line 1106 imprinted or embedded on a lower portion of its surface. The interconnectors 1104 and a seal control line 1106 are intact when the tear-away tab 1100 is adhered to the data collection device (see FIG. 11A). Removal of the tear-away tab 1100 (see FIG. 11B) severs the interconnectors 1104 and the seal control line 1106, thereby preventing response data stored in a memory from being altered. This can be accomplished by including interconnectors from power sources 1108 as one or more of the interconnectors 1104 appearing across the tear-away tab 1100. In addition, the seal control line 1106 can act as a locking circuit that is monitored by a microcontroller 1102. When broken, the seal control line 1106 renders it difficult, or unfeasible, to further alter memory containing response data. This can be accomplished by having the disconnect of the seal control line 1102 cause a memory write command, a switch detect command, and/or a power on command to be set to zero. After the tear-away tab 1100 is removed, contents of the memory can only be practically retrieved by use of a data transfer means, such as an RF transceiver system and a capture radio. Retrieval can be secured by using a password scheme, or requiring an access code to revive a locked data collection device.

The accuracy and integrity of communication between a data collection device, whether by means of an RF system or a physical connector, can be improved by using error correction coding (e.g., forward error correction, cyclic redundancy coding, or convolutional coding), and/or the use of checksums. Use of a checksum routine also can provide an audit function as explained in greater detail below.

Additional data can be added to the raw response data, entered by a user operating a data collection device, to provide a means for checking the accuracy and integrity of the raw response data. This can be achieved, in an exemplary embodiment of the invention, by creating a critical data element for a set, or subsets of raw response data. As depicted in FIG. 12B, a critical data element 1200 includes: a data type designator 1202, a time tag 1204, a word count and parity information 1206, a header checksum 1208, record unique data 1210, a data checksum 1212, and a critical data element checksum 1214. The data type designator 1202, time tag 1204, and word count 1206 make up the data from which the header checksum 1208 is derived.

Figure 12A:
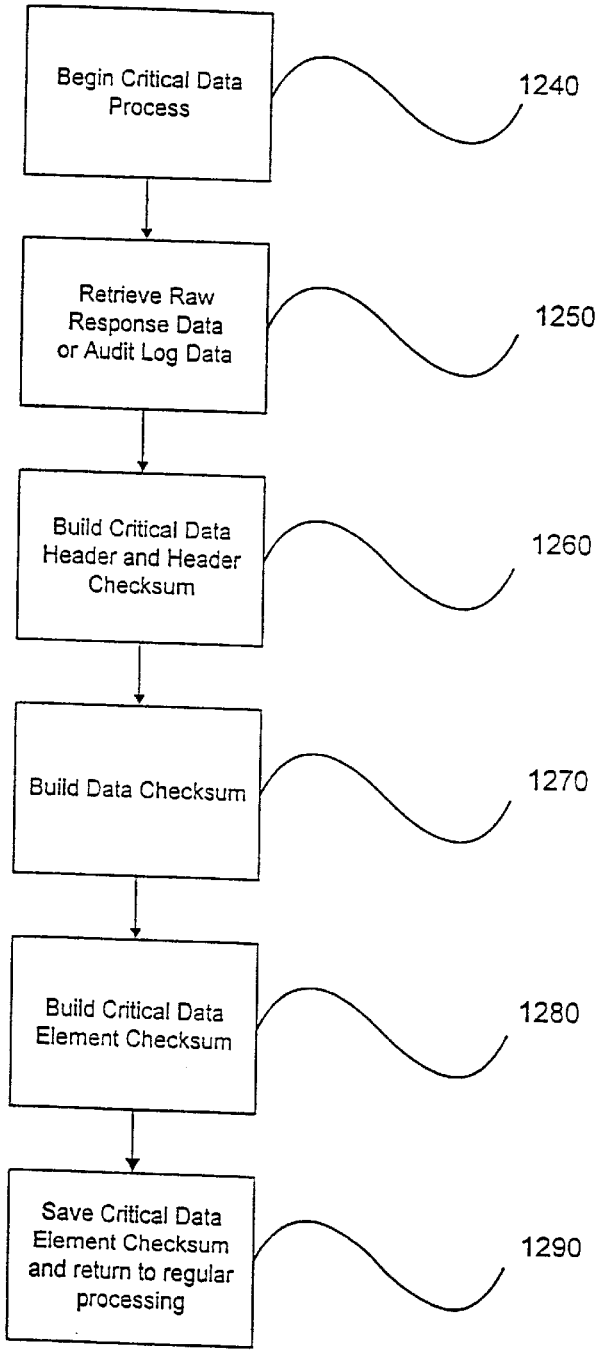
FIG. 12A depicts a Critical Data Checksum process in accordance with an exemplary embodiment of the invention.
Figure 12B:
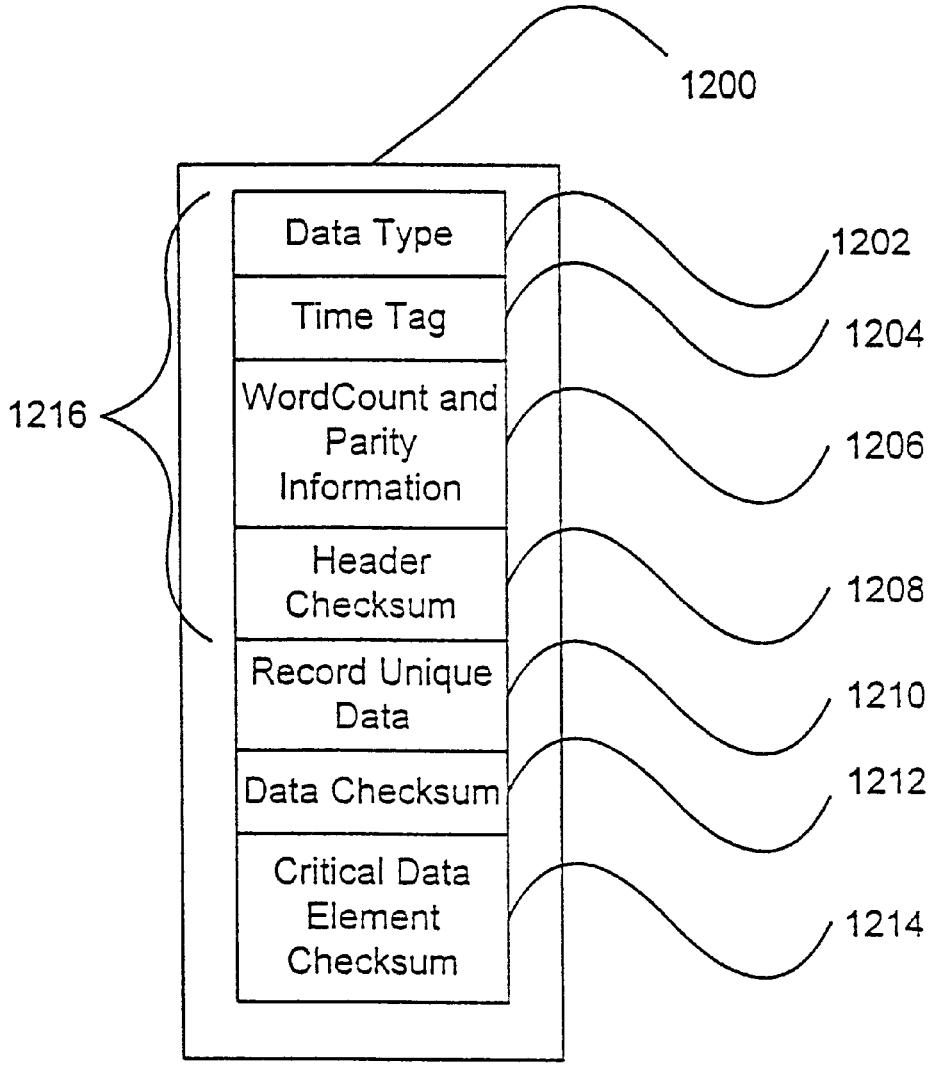
FIG. 12B depicts a Critical Data Element in accordance with an exemplary embodiment of the invention.

A device's Critical Data-Processing processes in accordance with an exemplary embodiment of the invention, are shown in FIG. 12A. These processes produce a Critical Data Element 1200 that can be utilized for either an individual data record or for an audit trail record. Raw response data contained within the Critical Data Element 1200 will vary in form and content depending on whether an individual data record or an audit trail record is created. Accordingly, the data type 1202 will indicate the type of information (individual data record or audit record) corresponding to the Critical Data Element 1200.

The Critical Data Process of FIG. 12A can be used to build a Critical Data Element 1200 around raw (response) information for either record type. The information created for a record includes: a Critical Data Element Header 1216, a Time Tag 1204, word count and word parity information 1206 corresponding to each word of the stored data. A Header Checksum 1208 is also provided which indicates the number of bits in the Critical Data Element Header 1216.

FIG. 12A shows exemplary processing performed to produce the Critical Data Header and the multiple checksums. When the Critical Data Process is performed to produce a record from the raw response data, it first tests and sets a parity bit for each 8 bit byte of the raw data element (block 1250). The raw response data is thereinafter referred to as Record Unique Data 1210. The process then builds the Critical Data Element Header which consists of the Data Type identifier 1202; a Time Tag 1204 which is the current real time of the device (a unique number for each Critical Data Element 1208); and a Header Checksum 1208 (block 1260). The Header Checksum 1208 is a numerical addition of the data in the Critical Data Element Header (any overflow is ignored).

A second checksum, the Data Checksum 1212, is built on the Record Unique Data and utilizes the same checksum process (block 1270). The Data Checksum 1212 is a numerical addition of all bits in the Record Unique Data (any overflow is ignored). As previously mentioned, the Record Unique Data is simply the raw data which has been processed for parity information.

The final step in the Critical Data Process is to build a third checksum, Critical Data Element Checksum 1214, for the entire Critical Data Element (block 1280). The Critical Data Element Checksum is a numerical addition of all bits contained within the Critical Data Element. The Critical Data Element Checksum is a unique number which incorporates the information from the Time Tagged Number of Words. The Critical Data Element 1200 is then saved and the controller returns to normal function (block 1290).

This combination of header data, parity, and multiple checksums guarantees that the stored data is accurate and true, and if a data error or corruption were to occur, the arrangement allows detection of the incorrect data and repair of the incorrect data.

Figure 13:
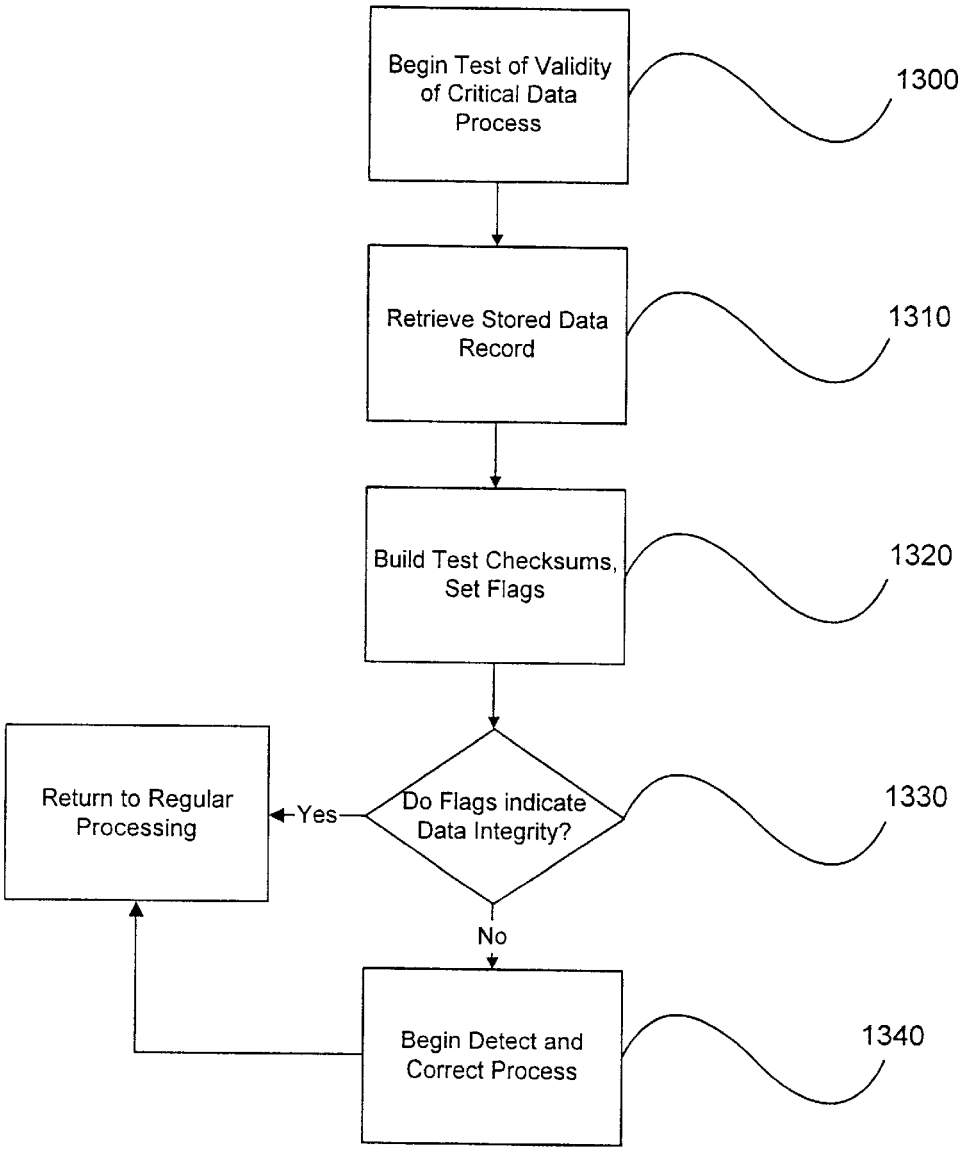
FIG. 13 depicts a data validity checking process in accordance with an exemplary embodiment of the invention.

FIG. 13 depicts the Test Valid Critical Data Store Method procedure which uses data verification processes to read and verify stored critical data. Each process that reads, stores or otherwise utilizes data within the Critical Data Element preferably verifies the data prior to performing any other process. This ensures that the information is correct.

As shown in FIG. 13, the Test Valid Critical Data Store Method processes and verifies the integrity of a Critical Data Element 1200 by retrieving (block 1310) and regenerating (block 1320) the checksums contained within Critical Data Element and comparing (block 1330) the result to the checksums generated and stored by the Critical Data Process of FIG. 12A. If the checksums are equal, the data is deemed valid and the integrity of the information considered to be correct. However, if the checksums are not equal, a Detect and Correct Process (block 1340), as described below in reference to FIG. 14, is performed to correct incorrect data.

Figure 14:
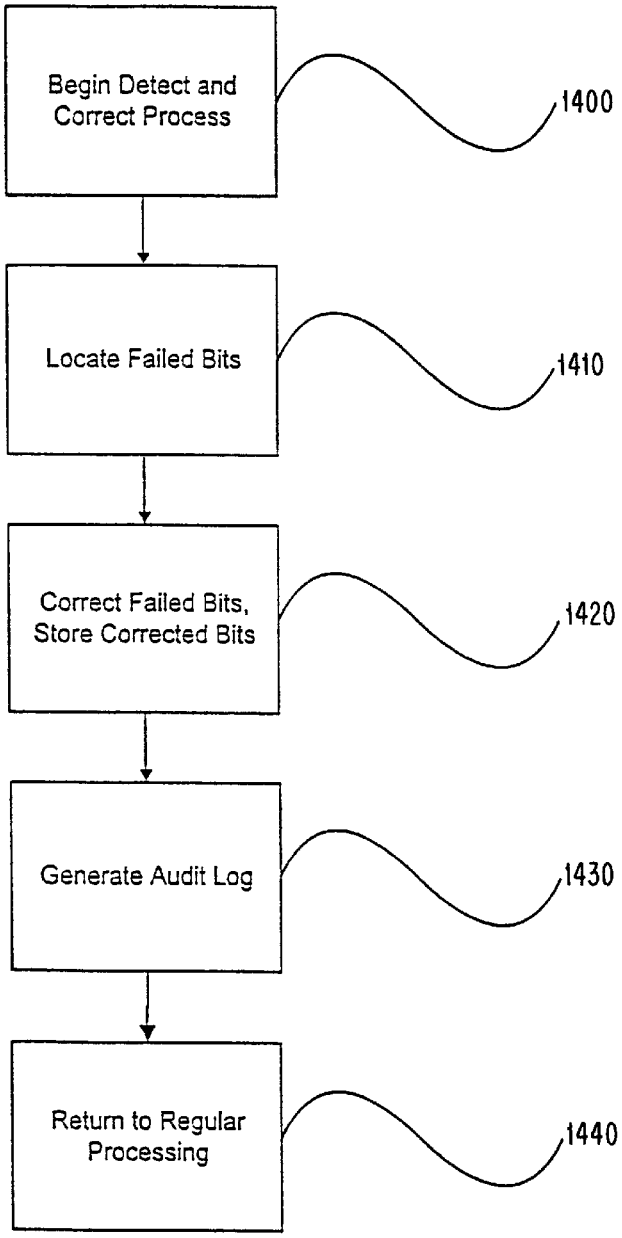
FIG. 14 depicts a data correcting process in accordance with an exemplary embodiment of the invention.

FIG. 14 depicts the Detect and Correct Process that is performed to correct stored data errors. First, each checksum is tested to identify which part of the critical data element is incorrect (block 1410). In other words, each checksum including the Header Checksum 1208, The Data Checksum 1212, and the Critical Data Element Checksum 1214 is recalculated and compared with the sorted value in the Critical Data Element. An incorrect match will indicate which portion of the Critical Data Element is in error.

Next, a test of each parity bit corresponding to each byte of data is recalculated and compared with the stored value to determine which byte of data is incorrect. The combination of the checksum and the parity information thus provides a unique determination of the data bit or bits that are incorrect. The process then "repairs" the data, in a process described below, by setting the incorrect bits to their correct value.

The repair process is shown by the Test Valid Critical Data Store of FIG. 13. First, the stored information is read. Next, the parity information for a corrupted byte is analyzed. The parity information for each byte of data will identify which byte has the incorrect data. Each possible combination of bits for the incorrect byte is then sequentially generated and added to the other bytes in the record. The checksum is then recalculated and compared with the stored value. This process is repeated until the value of the added bytes equals the checksum. The incorrect byte is then replaced with the "repaired" byte to thereby repair the incorrect byte (block 1420). This process may be used to repair either the Critical Data Header or Record Unique Data.

Returning now to FIG. 14, the process generates an audit log record of the fact that the record was repaired (block 1430). This feature, incorporated together with the specified data record content proves the truth of the data. These techniques can also be used in the data collection system for any process that stores, reads, or uses critical data. These methods assure the accuracy and truth of the critical data elements produced, the audit trail, and the individual data record.

Exemplary applications of the invention have been described. However, one skilled in the art will readily appreciate and recognize that the data collection device in accordance with the invention can be applied in any scenario requiring collection of data. The invention provides the benefit of removing the requirement for expensive scanning equipment and its corresponding computing platforms and software.

The invention has been described with reference to particular embodiments. However, it will be readily apparent to those skilled in the art that it is possible to embody the invention in specific forms other than those of the embodiments described above. Embodiment of the invention in ways not specifically described may be done without departing from the spirit of the invention. Therefore, the preferred embodiments described herein are merely illustrative and should not be considered restrictive in any way. The scope of the invention is given by the appended claims, rather than by the preceding description, and all variations and equivalents which fall within the range of the claims are intended to be embraced therein.

What is claimed is:

1. An apparatus for data collection, said apparatus comprising:

a sandwich structure having a top sheet, a backing sheet, and a middle sheet positioned between said top sheet and said backing sheet;

a display mounted on an upper surface of said backing sheet, said display passing through a display aperture defined in said middle sheet, said display being received in and disposed in a display aperture defined in said top sheet;

a set of switches a first half of which are defined on an upper surface of said backing sheet, a second half of which are defined on a bottom surface of said top sheet, wherein a set of apertures are defined in said middle sheet to define a space between each of said first and second switch halves;

a memory mounted on said upper surface of said backing sheet;

a data transfer device mounted on said upper surface of said backing sheet;

a microcontroller unit mounted on said upper surface of said backing sheet, said microcontroller unit being connected to said display, said set of switches, said memory, and said data transfer device, and a power source connected to said microcontroller unit for supplying power to said microcontroller unit; wherein said microcontroller unit controls said display to display a question, controlling said memory to store response data entered by a user using said set of switches in response to said question, and controlling said data transfer device to supply said stored response data to an external capture device in response to an external signal.

2. The apparatus claimed in claim 1, wherein said top, middle and backing sheets comprise paper.

3. The apparatus claimed in claim 1, wherein said top, middle and backing sheets comprise plastic.

4. The apparatus claimed in claim 1, wherein the microcontroller is connected to said display, said set of switches, said memory, said data transfer device, and said power source by interconnectors comprised of conductive ink printed on said backing sheet.

5. The apparatus claimed in claim 1, wherein the microcontroller is connected to said display, said set of switches, said memory, said data transfer device, and said power source by interconnectors comprised of conductive adhesive deposited on said backing sheet.

6. The apparatus claimed in claim 1, wherein said display is selected from the group consisting of a liquid crystal display, an encapsulated liquid crystal display, a light emitting diode display, an electroluminescent display, and a break out indicator display.

7. The apparatus claimed in claim 1, wherein said memory is ferrous RAM.

8. The apparatus claimed in claim 1, wherein said microcontroller and said memory are integrated into a single device.

9. The apparatus claimed in claim 1, wherein said data transfer device is a physical connector.

10. The apparatus claimed in claim 1, wherein said data transfer device is a radio frequency device.

11. The apparatus claimed in claim 10, wherein said microcontroller, said memory, and said data transfer device are integrated into a single device.

12. The apparatus claimed in claim 10, further comprising:

a power antenna, wherein said data transfer device is supplied with power from said power antenna when said power antenna is excited by an external source.

13. The apparatus claimed in claim 1, wherein data communicated between the data transfer device and the external capture means is encoded.

14. The apparatus claimed in claim 10, wherein said microcontroller receives question data through said radio frequency device.

15. The apparatus claimed in claim 1, wherein said power source is selected from the group consisting of at least one battery, at least one solar cell, and a combination of at least one battery and at least one solar cell.

16. Apparatus comprising:

an envelope structure having a front sheet and a back sheet, said front sheet and said back sheet defining a thin interior space therebetween;

a display disposed in said front sheet;

a set of switches disposed in said front sheet;

a memory disposed in said interior space;

a data output device disposed in said interior space;

a data processing unit disposed in said interior space and connected to said display, said set of switches, said memory, and said data output device, said data processing unit controlling said display to display a query, controlling said memory to store response data entered by a user using said set of switches in response to said query, and controlling said data output device to transfer said response data from said memory to an external device in response to an external signal; and a power source connected to said data processing device for supplying power to said data processing device.

17. An electronic data collection device rendered in a substantially two-dimensional configuration, the data collection device comprising:

means for displaying information inviting a respondent to enter a response;

means for inputting the response;

means for storing the response;

means for transferring the response pursuant to a request;

means for controlling the displaying means, the inputting means, the storing means and the transferring means; and means for supplying operating power to the display means, the inputting means, and the storing means.

18. A substantially two-dimensional electronic data collection device comprising:

a plurality of flexible material sheet layers having a combination of components secured therein, the components comprising:

an information display for displaying information inviting a respondent to enter a response;

a plurality of switch devices for entering a response;

a memory for storing the response entered by the respondent;

a data transfer device for supplying the stored responses to a data accumulation device in response to a request from the data accumulation device;

a microcontroller for controlling the information display, for monitoring the plurality of switch devices, and for facilitating the transfer of responses to the data accumulation device; and a power supply for providing power to the information display, to the memory, and to the microcontroller.

19. Apparatus comprising:

an envelope structure having a top sheet, and a backing sheet, an upper surface of said top sheet being printed with a set of candidates for election;

a set of switches disposed within said envelope structure and positioned adjacent to said set of candidates so that actuation of one of said set of switches by a voter indicates selection of a candidate;

a memory disposed within said envelope structure for storing candidate selections;

a data transfer device disposed within said envelope structure for communicating candidate selections stored in said memory to an external capture device;

a microcontroller disposed within said envelope structure, which microcontroller is connected to said set of switches, said memory, and said data transfer device, and a power source disposed within said envelope structure, which power source is connected, and supplies power, to said microcontroller.

20. The apparatus claimed in claim 19 further comprising:

a set of selection indicators positioned next to each switch of said set of switches, wherein actuation of a switch causes a corresponding selection indicator to be energized.

21. The apparatus claimed in claim 19 further comprising:

a pull tab which when removed locks the apparatus thereby rendering it difficult to alter candidate selection data.

22. The apparatus claimed in claim 19 further comprising:

switches corresponding to a write-in candidate; and an alphanumeric keyboard for entering write-in candidate information.

23. The apparatus claimed in claim 19 further comprising:

an information display.

24. Apparatus comprising:

an envelope structure having a top sheet, and a backing sheet;

a display disposed within said envelope structure and appearing though an aperture formed in said top sheet, said display displaying census questions;

a set of switches disposed within said envelope structure for responding to said census questions, said switches including an alphanumeric keyboard;

a memory disposed within said envelope structure;

a data transfer device disposed within said envelope structure;

a microcontroller connected to said set of switches, said memory, and said data transfer device, and a power source connected to said microcontroller for supplying power to said microcontroller unit.

25. Apparatus comprising:

an envelope structure including a front sheet and a back sheet defining a thin interior space therebetween, said front sheet and said back sheet having a first lateral dimension and a second lateral dimension;

a display disposed in said front sheet;

a set of switches disposed in said front sheet;

a memory disposed in said interior space;

a data output device disposed in said interior space;

a data processing unit disposed in said interior space and connected to said display, said set of switches, said memory, and said data output device, said data processing unit controlling said display to display a query, controlling said memory to store response data entered by a user using said set of switches in response to said query, and controlling said data output device to transfer said response data from said memory to an external device in response to an external signal; and a power source connected to said data processing device for supplying power to said data processing device, wherein a thickness of said apparatus is in a range of about 0.09 to 0.15 inches and said first and second lateral dimensions are in the range of about 3.0 to 14.5 inches.

*26. A data collection device comprising:*

*an envelope structure having a top surface and a back surface;*

*a display disposed within said envelope structure for displaying information inviting a respondent to enter a response;*

*a plurality of switches disposed within said envelope structure for entering a response;*

*a memory disposed within said envelope structure for storing the data;*

*a data transfer device disposed within said envelope structure for electronically transferring the stored data to an external capture device;*

*a microcontroller unit disposed within said envelope structure for controlling the plurality of switches, the memory, and the data transfer device; and*

*a power source for supplying operating power to the microcontroller unit.*

*27. The device as claimed in claim 26, wherein said data transfer device transfers the stored data responsive to a request from said external capture device.*

*28. The device as claimed in claim 26, wherein said data transfer device transfers the stored data responsive to proximity to said external capture device.*

*29. The device as claimed in claim 26, wherein the data transfer device includes an RF interface.*

*30. The device as claimed in claim 26, wherein said plurality of switches include membrane switches.*

*31. The device as claimed in claim 26, wherein said plurality of switches include capacitive switches.*

*32. The device as claimed in claim 26, wherein said memory is part of said microcontroller unit and also stores operating instructions for controlling the device.*

*33. The device as claimed in claim 26, wherein said plurality of switches are activated using a touch pad.*

*34. The device as claimed in claim 26, wherein said plurality of switches are activated using a keyboard.*

*35. A data collection apparatus comprising:*

*a substantially two-dimensional structure having a top sheet and a backing sheet, said top sheet adapted to present a plurality of selection options to a user;*

*a set of switches disposed within said substantially two-dimensional structure and positioned adjacent said plurality of selection options so that actuation of one of the switches within the set of switches by the user indicates selections of a respective one of said plurality of selection options;*

*a memory disposed within said substantially two-dimensional structure for storing option selections;*

*a data transfer device disposed within said substantially two-dimensional structure for communicating option selections stored in said memory to an external capture device;*

*a microcontroller disposed within said substantially two-dimensional structure and connected to said set of switches, said memory, and said data transfer device; and*

*a power source connected, and supplying power, to said microcontroller.*

*36. The apparatus as set forth in claim 35, wherein said plurality of selection options are printed on an upper surface of the top sheet.*

*37. The apparatus as set forth in claim 35, wherein said data transfer device also receives and downloads instructions from an external device preparatory to user selection.*

*38. The apparatus as set forth in claim 35, and further comprising a display for displaying an option selection selected by the user.*

*39. An apparatus for collecting data inputted by a user selecting one of a plurality of selection options in response to a plurality of queries, said apparatus comprising:*

*a substantially two-dimensional structure having a top surface and a back surface;*

*a display disposed within said substantially two-dimensional structure and visible from said top surface to present a plurality of selection options;*

*a set of switches for activation by said user, actuation of one of said switches within the set of switches indicating selection of a respective one of said plurality of selection options;*

*a memory disposed within said substantially two-dimensional structure for storing said option selections selected by said user;*

*a data transfer device disposed within said substantially two-dimensional structure for communicating said option selections stored in said memory to an external capture device;*

*a microcontroller disposed within said substantially two-dimensional structure and connected to said set of switches, said memory, said data transfer device, and said display; and*

*a power source for supplying power to said microcontroller.*

*40. The apparatus as set forth in claim 39, wherein said power source is disposed within said substantially two-dimensional structure.*

*41. An apparatus for collecting data inputted by a user selecting one of a plurality of selection options in response to a plurality of queries, said apparatus comprising:*

*a substantially two-dimensional structure having a top sheet and a backing sheet, said top sheet adapted to present a plurality of selection options;*

*a set of switches for activation by said user, actuation of one of said switches within the set of switches indicating selection of a respective one of said plurality of selection options;*

*a display connected to said set of switches so that activation of one of said switches within said set of switches indicates said selection to the user;*

*a memory for storing said option selections selected by said user;*

*a data transfer device for communicating said option selections stored in said memory to an external capture device;*

*a data processing unit connected to said set of switches, said memory, and said data transfer device, and controlling said display; and*

*a power source connected and supplying power to said data processing unit;*

*said display, said switches, said memory, said data transfer device and said data processing unit all disposed within said substantially two-dimensional structure.*

*42. The apparatus as set forth in claim 41, wherein said data processing unit also controls said display to display a query from said plurality of queries.*

* * * * *